(12) United States Patent
Nakano

(10) Patent No.: US 10,044,671 B2
(45) Date of Patent: Aug. 7, 2018

(54) CONTROL APPARATUS, COMMUNICATION SYSTEM, COMMUNICATION METHOD, AND PROGRAM

(71) Applicant: NEC Corporation, Tokyo (JP)

(72) Inventor: Takahiro Nakano, Tokyo (JP)

(73) Assignee: NEC Corporation, Tokyo (JP)

(*) Notice: Subject to any disclaimer, the term of this patent is extended or adjusted under 35 U.S.C. 154(b) by 253 days.

(21) Appl. No.: 14/647,428

(22) PCT Filed: Nov. 26, 2013

(86) PCT No.: PCT/JP2013/081803
§ 371 (c)(1),
(2) Date: May 26, 2015

(87) PCT Pub. No.: WO2014/084216
PCT Pub. Date: Jun. 5, 2014

(65) Prior Publication Data
US 2015/0312206 A1 Oct. 29, 2015

(30) Foreign Application Priority Data
Nov. 27, 2012 (JP) ................. 2012-258406

(51) Int. Cl.
H04L 12/58 (2006.01)
H04L 29/12 (2006.01)
(Continued)

(52) U.S. Cl.
CPC ........ H04L 61/103 (2013.01); H04L 41/0806 (2013.01); H04L 67/28 (2013.01)

(58) Field of Classification Search
None
See application file for complete search history.

(56) References Cited

U.S. PATENT DOCUMENTS

| 9,319,375 B2* | 4/2016 | Gross, IV ............. H04L 61/103 |
| 2013/0148667 A1 | 6/2013 | Hama et al. |
| 2013/0279371 A1 | 10/2013 | Takashima et al. |

FOREIGN PATENT DOCUMENTS

| JP | 2011-101245 A | 5/2011 |
| JP | 2012-175394 A | 9/2012 |

(Continued)

OTHER PUBLICATIONS

International Search Report (ISR) (PCT Form PCT/ISA/210), in PCT/JP2013/081803, dated Feb. 25, 2014.
(Continued)

Primary Examiner — Zewdu A Beyen
(74) Attorney, Agent, or Firm — Finnegan, Henderson, Farabow, Garrett & Dunner, L.L.P.

(57) ABSTRACT

A control apparatus includes: a first control information setting unit configured to set first control information for forwarding packets between predetermined machines in relay apparatuses on a predetermined path on the basis of a first hierarchical address; and a second control information setting unit configured to set, when receiving a packet whose destination address is a second hierarchical address, which is a higher level address than the first hierarchical address, from one of the machines in which the first control information has already been set, via one of the relay apparatuses, second control information for converting a first hierarchical destination address of the packet whose destination address is the second hierarchical address into a first hierarchical address specified in the first control information and forwarding the converted packet, in the relay apparatus.

12 Claims, 35 Drawing Sheets

(51) Int. Cl.
*H04L 29/08* (2006.01)
*H04L 12/24* (2006.01)

(56) References Cited

FOREIGN PATENT DOCUMENTS

| WO | WO 2012/023604 A1 | 2/2012 |
| WO | WO 2012/096131 A1 | 7/2012 |

OTHER PUBLICATIONS

Nick McKeown, and seven others, "OpenFlow: Enabling Innovation in Campus Networks", [online], [searched on Sep. 25, 2012], Internet <URL:http://www.openflow.org/documents/openflow-wp-latest.pdf>.

"OpenFlow Switch Specification" Version 1.1.0 Implemented (Wire Protocol 0x02), [online], [searched on Sep. 25, 2012], Internet <URL:http://www.openflow.org/documents/openflow-spec-v1.1.0.pdf>.

\* cited by examiner

FIG. 6

| RELAY APPARATUS | PORT INFORMATION | NEIGHBORING RELAY APPARATUS | NEIGHBORING PORT INFORMATION |
|---|---|---|---|
| 1103 | P1 | N/A | N/A |
| 1103 | P2 | N/A | N/A |
| .. | .. | .. | .. |
| 1104 | P1 | N/A | N/A |
| 1104 | P2 | N/A | N/A |

FIG. 7

| LEGACY DETERMINATION INFORMATION | DETERMINATION VLAN | CONNECTION PORT |
|---|---|---|
| 1200 | 3000 | P2 OF 1103<br>P2 OF 1104 |

FIG. 8

| CONNECTION PORT INFORMATION | MAC OF PORT | CONNECTION STATUS |
|---|---|---|
| P2 OF 1103 | MAC-A | CONNECTED |
| P2 OF 1104 | MAC-B | CONNECTED |

FIG. 12

| RELAY APPARATUS | PORT | MATCH CONDITION | Action |
|---|---|---|---|
| 1103 | P2 | N/A | DROP |
| 1103 | P2 | SMAC IS MAC-B | DROP |

(last two rows ADDED)

| RELAY APPARATUS | PORT | MATCH CONDITION | Action |
|---|---|---|---|
| 1104 | P2 | N/A | DROP |
| 1104 | P2 | SMAC IS MAC-A | DROP |

(last two rows ADDED)

FIG. 14

| RELAY APPARATUS | PORT INFORMATION | NEIGHBORING RELAY APPARATUS | NEIGHBORING PORT INFORMATION |
|---|---|---|---|
| 1103 | P1 | N/A | N/A |
| 1103 | P2 | 1104 | P2 |
| .. | .. | .. | .. |
| 1104 | P1 | N/A | N/A |
| 1104 | P2 | 1103 | P2 |

FIG. 17

| RELAY APPARATUS | PORT | MATCH CONDITION | Action |
|---|---|---|---|
| 1103 | P2 | N/A | DROP |
| 1103 | P2 | SMAC IS MAC-B | DROP |
| 1103 | P1 | SMAC IS MAC ADDRESS OF TERMINAL APPARATUS 1102<br>DMAC IS MAC ADDRESS OF TERMINAL APPARATUS 1105 | FORWARD FROM P2<br>ADD VID 3000<br>CONVERT SMAC INTO MAC-A<br>CONVERT DMAC INTO MAC-B |
| 1103 | P2 | DMAC IS MAC-A | FORWARD FROM P1<br>DELETE VID 3000<br>CONVERT SMAC INTO MAC ADDRESS OF TERMINAL APPARATUS 1105<br>CONVERT DMAC INTO MAC ADDRESS OF TERMINAL APPARATUS 1102 |

(Last two rows: ADDED)

FIG. 18

| RELAY APPARATUS | PORT | MATCH CONDITION | Action |
|---|---|---|---|
| 1104 | P2 | N/A | DROP |
| 1104 | P2 | SMAC IS MAC-A | DROP |
| 1104 | P1 | SMAC IS MAC ADDRESS OF TERMINAL APPARATUS 1105 DMAC IS MAC ADDRESS OF TERMINAL APPARATUS 1102 | FORWARD FROM P2 ADD VID 3000 CONVERT SMAC INTO MAC-B CONVERT DMAC INTO MAC-A |
| 1104 | P2 | DMAC IS MAC-B | FORWARD FROM P1 DELETE VID 3000 CONVERT SMAC INTO MAC ADDRESS OF TERMINAL APPARATUS 1102 CONVERT DMAC INTO MAC ADDRESS OF TERMINAL APPARATUS 1105 |

{ ADDED: last two rows }

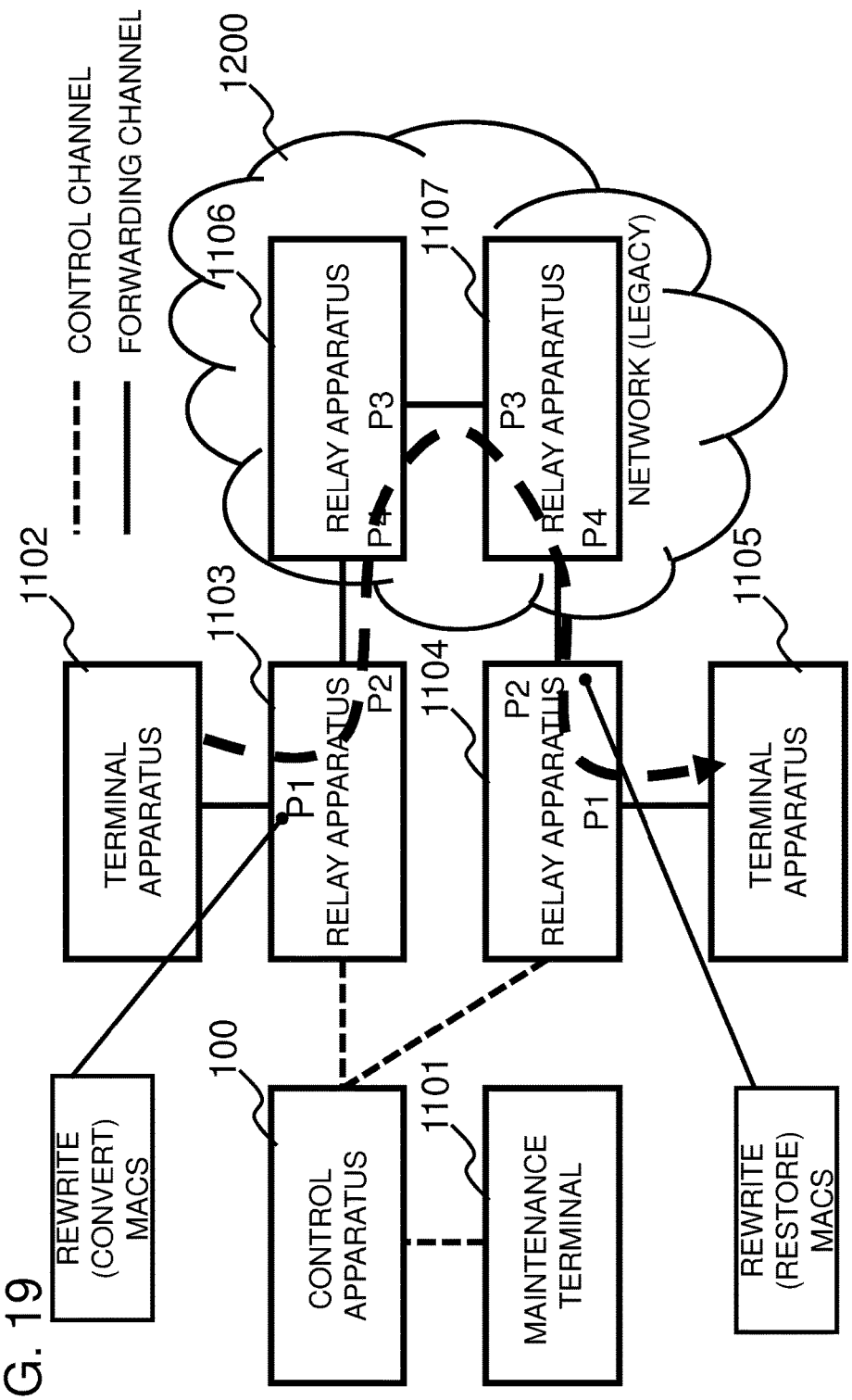

FIG. 30

| | RELAY APPARATUS 30-1 | RELAY APPARATUS 20-1 | RELAY APPARATUS 30-2 |
|---|---|---|---|
| VM1 -> VM5 | MATCH CONDITION<br>DESTINATION MAC = MAC ADDRESS OF VM5<br>ACTION<br>OUTPUT FROM PORT CONNECTED TO RELAY APPARATUS 20-1 | MATCH CONDITION<br>DESTINATION MAC = MAC ADDRESS OF VM5<br>ACTION<br>OUTPUT FROM PORT CONNECTED TO RELAY APPARATUS 30-2 | MATCH CONDITION<br>DESTINATION MAC = MAC ADDRESS OF VM5<br>ACTION<br>OUTPUT FROM PORT CONNECTED TO MACHINE 40-3 |

FIG. 31

| | SWITCH 30-2 | SWITCH 20-1 | SWITCH 30-1 |
|---|---|---|---|
| VM5->VM1 | MATCH CONDITION DESTINATION MAC = MAC ADDRESS OF VM1 ACTION OUTPUT FROM PORT CONNECTED TO RELAY APPARATUS 20-1 | MATCH CONDITION DESTINATION MAC = MAC ADDRESS OF VM1 ACTION OUTPUT FROM PORT CONNECTED TO RELAY APPARATUS 30-1 | MATCH CONDITION DESTINATION MAC = MAC ADDRESS OF VM1 ACTION OUTPUT FROM PORT CONNECTED TO MACHINE 40-1 |

FIG. 32

|  |  | SOURCE MAC | DESTINATION MAC | SOURCE IP | DESTINATION IP |
|---|---|---|---|---|---|
| L2 | VM1->VM5 | VM1 | VM5 |  |  |
|  | VM5->VM1 | VM5 | VM1 |  |  |
| L3 | VM1->VM5 | VM1 | GW | VM1 | VM5 |
|  | VM5->VM1 | VM5 | GW | VM5 | VM1 |

FIG. 34

| | RELAY APPARATUS 30-1 | RELAY APPARATUS 20-1 | RELAY APPARATUS 30-2 |
|---|---|---|---|
| VM1->VM5 | MATCH CONDITION<br>  DESTINATION MAC = MAC ADDRESS OF GW<br>  DESTINATION IP = IP ADDRESS OF VM5<br>ACTION<br>  SET MAC ADDRESS OF GW AS SOURCE MAC ADDRESS<br>  SET MAC ADDRESS OF VM5 AS DESTINATION MAC ADDRESS<br>  OUTPUT FROM PORT CONNECTED TO RELAY APPARATUS 20-1 | MATCH CONDITION<br>  DESTINATION MAC = MAC ADDRESS OF VM5<br>ACTION<br>  OUTPUT FROM PORT CONNECTED TO RELAY APPARATUS 30-2 | MATCH CONDITION<br>  DESTINATION MAC = MAC ADDRESS OF VM5<br>ACTION<br>  OUTPUT FROM PORT CONNECTED TO MACHINE 40-3 |

FIG. 35

| | RELAY APPARATUS 30-2 | RELAY APPARATUS 20-1 | RELAY APPARATUS 30-1 |
|---|---|---|---|
| VM5->VM1 | MATCH CONDITION<br>  DESTINATION MAC = MAC ADDRESS OF GW<br>  DESTINATION IP = IP ADDRESS OF VM1<br>ACTION<br>  SET MAC ADDRESS OF GW AS SOURCE MAC ADDRESS<br>  SET MAC ADDRESS OF VM1 AS DESTINATION MAC ADDRESS<br>  OUTPUT FROM PORT CONNECTED TO RELAY APPARATUS 20-1 | MATCH CONDITION<br>  DESTINATION MAC = MAC ADDRESS OF VM1<br>ACTION<br>  OUTPUT FROM PORT CONNECTED TO RELAY APPARATUS 30-2 | MATCH CONDITION<br>  DESTINATION MAC = MAC ADDRESS OF VM1<br>ACTION<br>  OUTPUT FROM PORT CONNECTED TO MACHINE 40-1 |

CONTROL APPARATUS, COMMUNICATION SYSTEM, COMMUNICATION METHOD, AND PROGRAM

REFERENCE TO RELATED APPLICATION

The present invention is based upon and claims the benefit of the priority of Japanese patent application No. 2012-258406, filed on Nov. 27, 2012, the disclosure of which is incorporated herein in its entirety by reference thereto.

TECHNICAL FIELD

The present invention relates to a control apparatus, a communication system, a communication method, and a program. In particular, it relates to: a control apparatus that realizes communication by controlling switches in a centralized manner; a communication system; a communication method; and a program.

BACKGROUND

In recent years, a technique referred to as OpenFlow has been proposed (see NPLs 1 and 2). OpenFlow recognizes communications as end-to-end flows and performs path control, failure recovery, load balancing, and optimization on a per-flow basis. Each OpenFlow switch according to NPL 2 has a secure channel for communication with an OpenFlow controller and operates according to a flow table suitably added or rewritten by the OpenFlow controller. In the flow table, a set of the following three is defined for each flow: match conditions (Match Fields) against which a packet header is matched; flow statistical information (Counters); and Instructions that define a processing content(s) (see section 4.1 "Flow Table" in NPL 2).

For example, when an OpenFlow switch receives a packet, the OpenFlow switch searches the flow table for an entry having a match condition (see section 4.3 "Match Fields" in NPL 2) that matches header information of the received packet. If, as a result of the search, the OpenFlow switch finds an entry matching the received packet, the OpenFlow switch updates the flow statistical information (Counters) and processes the received packet on the basis of a processing content(s) (packet transmission, flooding, dropping, etc. from a specified port) written in the Instructions field of the entry. If, as a result of the search, the OpenFlow switch does not find an entry matching the received packet, the OpenFlow switch transmits an entry setting request to the OpenFlow controller via the secure channel. Namely, the OpenFlow switch requests the OpenFlow controller to transmit control information for processing the received packet (Packet-In message). The OpenFlow switch receives a flow entry defining a processing content(s) and updates the flow table. In this way, by using an entry stored in the flow table as control information, the OpenFlow switch performs packet forwarding.

In addition, PTL 1 discloses a method for reducing the load of a path control apparatus that corresponds to the OpenFlow controller by setting different time-out values in the above flow entries for each section of a packet communication path.

PATENT LITERATURE (PTL)

[PTL 1]
Japanese Patent Kokai Publication No. 2011-101245A

NON PATENT LITERATURE (NPL)

[NPL 1]
Nick McKeown, and seven others, "OpenFlow: Enabling Innovation in Campus Networks", [online], [searched on Sep. 25, 2012], Internet <URL:http://www.openflow.org/documents/openflow-wp-latest.pdf>

[NPL 2]
"OpenFlow Switch Specification" Version 1.1.0 Implemented (Wire Protocol 0x02), [online], [searched on Sep. 25, 2012], Internet <URL:http://www.openflow.org/documents/openflow-spec-v1.1.0.pdf>

SUMMARY

The following analysis has been given by the present inventor. By setting a flow entry that specifies a destination MAC address as a match condition and outputting matching packets from a port corresponding to the destination MAC address as an action in an OpenFlow switch according to the above NPLs 1 and 2, the OpenFlow switch can be operated in the same way as a layer 2 switch (layer 2 and layer 3 will hereinafter be referred to as "L2" and "L3," respectively). In this method, since a source address is not specified as a match condition, the number of flow entries set in each switch and the number of queries transmitted to the OpenFlow controller (Packet-In) can be significantly reduced. These are considered as advantageous effects.

However, there is a problem that the above method only supports forwarding of L2 packets. For example, if a certain machine recognizes that a communication peer belongs to a different subnet, the machine transmits a packet (L3 packet) whose destination MAC address is the MAC address of a default gateway (for example, the OpenFlow controller) to the default gateway. In such case, according to the above method specialized for forwarding L2 packets, the L3 packet cannot be forwarded to the accurate destination. This is considered as a problem.

Of course, by setting a flow entry specifying a destination IP address or the like as a match condition in each switch on a path that leads to the original destination, the L3 packet transmitted from the machine can be forwarded to the accurate destination. However, the advantageous effects of the above method specialized for forwarding L2 packets could be lost.

It is an object of the present invention to provide a control apparatus, a communication system, a communication method, and a program that contribute to reduction in the number of control information entries set in each relay apparatus and reduction in the number of queries transmitted to the control apparatus in a centralized-control communication system as typified by the above OpenFlow.

According to a first aspect, there is provided a control apparatus, including: a first control information setting unit configured to set first control information for forwarding packets between predetermined machines in relay apparatuses on a predetermined path on the basis of a first hierarchical address; and a second control information setting unit configured to set, when receiving a packet whose destination address is a second hierarchical address, which is a higher level address than the first hierarchical address, from one of the machines in which the first control information has already been set, via one of the relay apparatuses, second control information for converting a first hierarchical destination address of the packet whose destination address is the second hierarchical address into a first hierarchical address specified in the first control information and forwarding the converted packet, in the relay apparatus.

According to a second aspect, there is provided a communication system, including: a control apparatus including:

a first control information setting unit configured to set first control information for forwarding packets between predetermined machines in relay apparatuses on a predetermined path on the basis of a first hierarchical address; and a second control information setting unit configured to set, when receiving a packet whose destination address is a second hierarchical address, which is a higher level address than the first hierarchical address, from one of the machines in which the first control information has already been set, via one of the relay apparatuses, second control information for converting a first hierarchical destination address of the packet whose destination address is the second hierarchical address into a first hierarchical address specified in the first control information and forwarding the converted packet, in the relay apparatus; and relay apparatuses in which the first and second control information is set by the control apparatus.

According to a third aspect, there is provided a communication method, including: setting first control information for forwarding packets between predetermined machines in relay apparatuses on a predetermined path on the basis of a first hierarchical address; and setting, when receiving a packet whose destination address is a second hierarchical address, which is a higher level address than the first hierarchical address, from one of the machines in which the first control information has already been set, via one of the relay apparatuses, second control information for converting a first hierarchical destination address of the packet whose destination address is the second hierarchical address into a first hierarchical address specified in the first control information and forwarding the converted packet, in the relay apparatus. This method is associated with a certain machine, namely, with the control apparatus that controls relay apparatuses by setting control information.

According to a fourth aspect, there is provided a program, causing a computer constituting a control apparatus to perform processing for: setting first control information for forwarding packets between predetermined machines in relay apparatuses on a predetermined path on the basis of a first hierarchical address; and setting, when receiving a packet whose destination address is a second hierarchical address, which is a higher level address than the first hierarchical address, from one of the machines in which the first control information has already been set, via one of the relay apparatuses, second control information for converting a first hierarchical destination address of the packet whose destination address is the second hierarchical address into a first hierarchical address specified in the first control information and forwarding the converted packet, in the relay apparatus. This program can be recorded in a computer-readable (non-transient) storage medium. Namely, the present invention can be embodied as a computer program product.

The meritorious effects of the present invention are summarized as follows. The present invention can contribute to reduction in the number of control information entries set in each relay apparatus and reduction in the number of queries transmitted to a control apparatus in a centralized-control communication system.

BRIEF DESCRIPTION OF DRAWINGS

FIG. 6 illustrates an exemplary configuration of a topology table (before a topology is acquired) in the control apparatus in the communication system according to the first exemplary embodiment of the present disclosure.

FIG. 7 illustrates an exemplary configuration of a legacy management table in the control apparatus in the communication system according to the first exemplary embodiment of the present disclosure.

FIG. 8 illustrates an exemplary configuration of a legacy link management table in the control apparatus in the communication system according to the first exemplary embodiment of the present disclosure.

FIG. 12 illustrates exemplary control information (flow entries) generated by the control apparatus in the communication system according to the first exemplary embodiment of the present disclosure.

FIG. 14 illustrates an exemplary configuration of a topology table (after the topology is updated) in the control apparatus in the communication system according to the first exemplary embodiment of the present disclosure.

FIG. 17 illustrates exemplary control information (flow entries) set in a relay apparatus 1103 by the control apparatus in the communication system according to the first exemplary embodiment of the present disclosure.

FIG. 18 illustrates exemplary control information (flow entries) set in a relay apparatus 1104 by the control apparatus in the communication system according to the first exemplary embodiment of the present disclosure.

FIG. 19 illustrates a forwarding path realized by the control information (flow entries) set in the relay apparatuses 1103 and 1104 by the control apparatus in the communication system according to the first exemplary embodiment of the present disclosure.

FIG. 30 illustrates exemplary control information (flow entries) set in switches by the control apparatus according to the sixth exemplary embodiment of the present disclosure.

FIG. 31 illustrates exemplary control information (flow entries) set in switches by the control apparatus according to the sixth exemplary embodiment of the present disclosure.

FIG. 32 illustrates source and destination addresses of L2 and L3 packets exchanged between VM1 and VM5 according to the sixth exemplary embodiment of the present disclosure.

FIG. 34 illustrates exemplary control information (flow entries) set in switches by the control apparatus according to the sixth exemplary embodiment of the present invention.

FIG. 35 illustrates exemplary control information (flow entries) set in switches by the control apparatus according to the sixth exemplary embodiment of the present disclosure.

PREFERRED MODES

Figure 1:
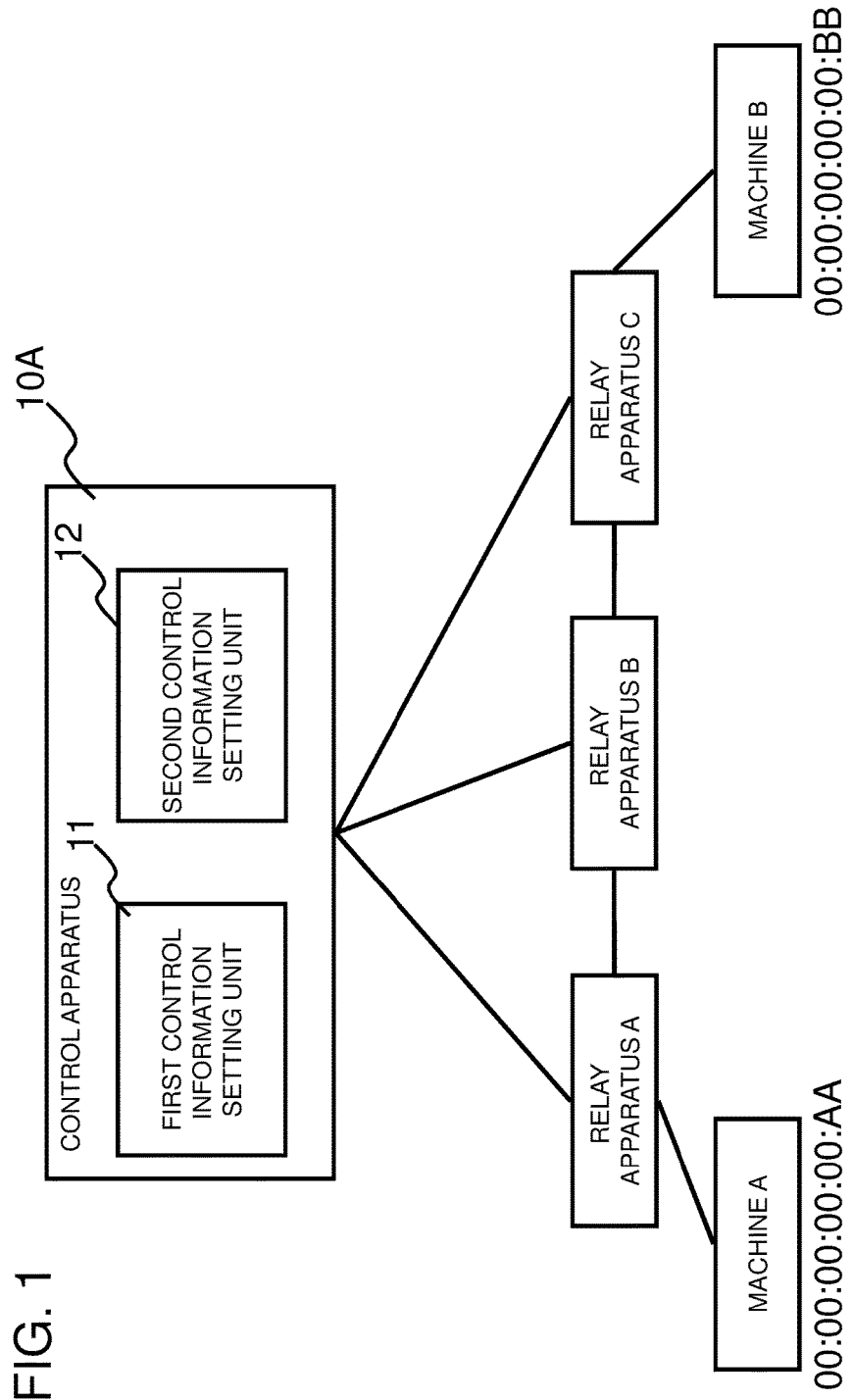
FIG. 1 illustrates a configuration of an exemplary embodiment according to the present disclosure.

First, an outline of an exemplary embodiment of the present disclosure will be described with reference to the drawings. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a control apparatus 10A that includes a first control information setting unit 11 and a second control information setting unit 12 and that controls a plurality of relay apparatuses A to C.

Figure 2:
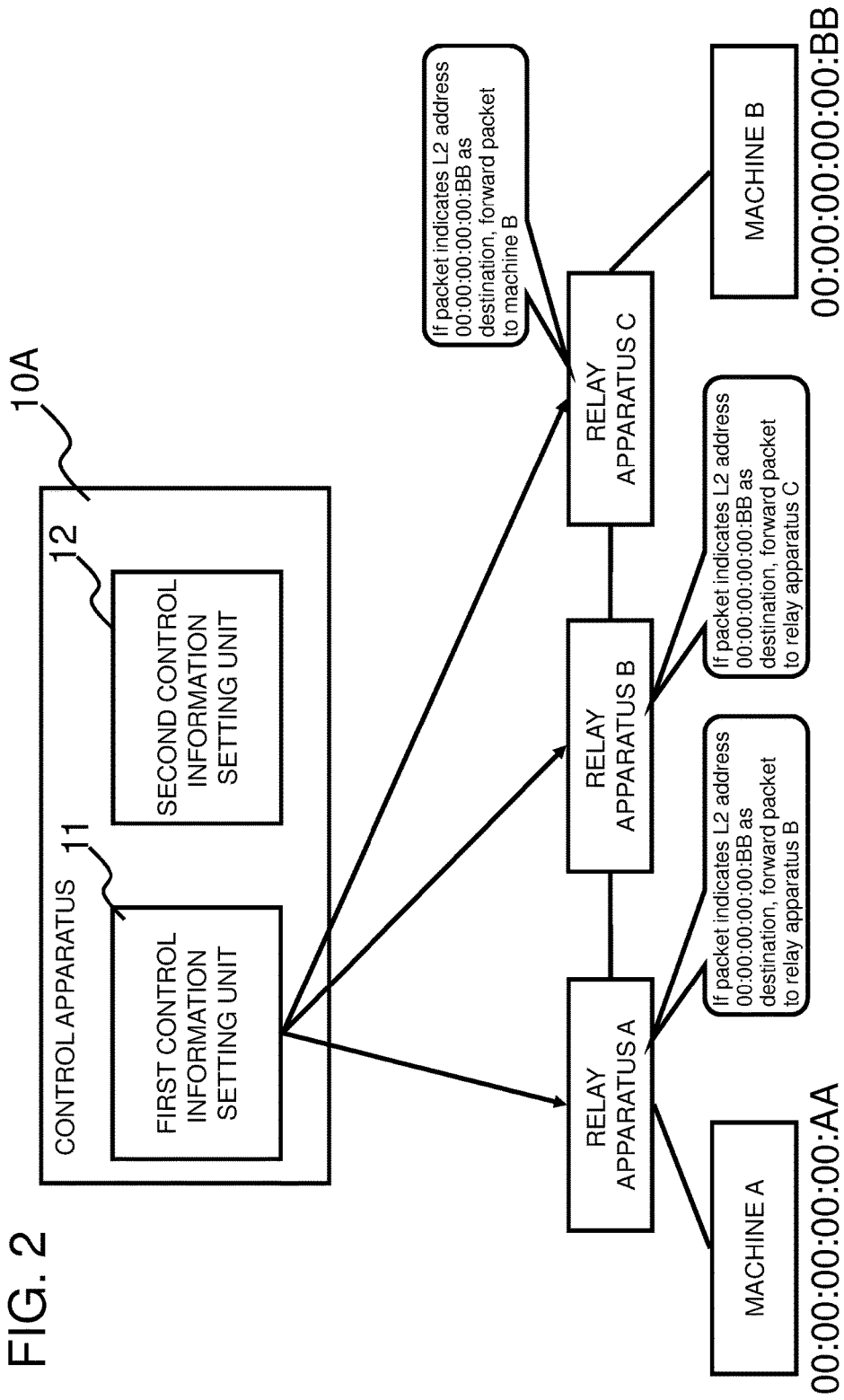
FIG. 2 illustrates an operation according to the exemplary embodiment of the present disclosure.

As illustrated in FIG. 2, the first control information setting unit 11 sets first control information for forwarding packets between predetermined machines in relay apparatuses (the relay apparatuses A to C) on a predetermined path on the basis of a first hierarchical address (in FIG. 2, an L2 address). In FIG. 2, the first control information setting unit 11 sets control information, which specifies forwarding packets from a machine A whose L2 address is 00:00:00:00:00:AA to a machine B whose L2 address is 00:00:00:00:00:BB, in the relay apparatuses A to C.

Figure 3:
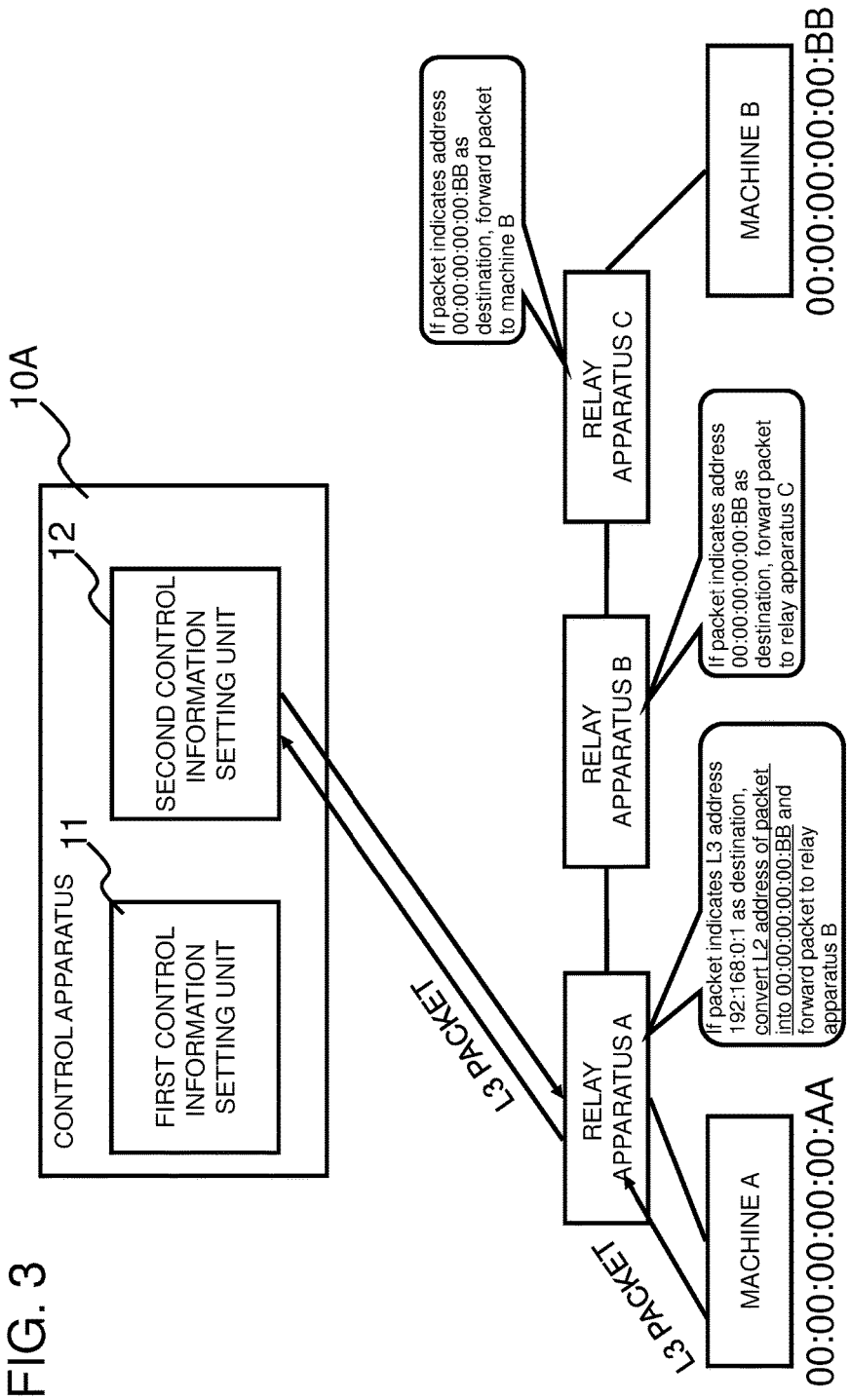
FIG. 3 illustrates an operation according to the exemplary embodiment of the present disclosure.

In contrast, as illustrated in FIG. 3, when the second control information setting unit 12 receives a packet (an L3 packet) whose destination address is a second hierarchical address, which is a higher level address than the first hierarchical address, from one of the machines A and B (the machine A in FIG. 3) in which the first control information has already been set, via the relay apparatus A, the second control information setting unit 12 sets second control information for converting a first hierarchical destination address of the packet whose destination address is the second hierarchical address into a first hierarchical address specified in the first control information and forwarding the converted packet, in the relay apparatus A. Since the L2 address or the like of the control apparatus 10A in FIG. 3 that also operates as a router or the like is set in the first hierarchical destination address of the packet (the L3 packet) whose destination address is the second hierarchical address, the relay apparatus A converts the L2 address of the control apparatus 10A in FIG. 3 into the L2 address of the machine B and forwards the converted packet.

As described above, based on a forwarding method using the first hierarchical address, an exemplary embodiment of the present disclosure enables forwarding packets which need to be forwarded beyond a router and in which a second hierarchical address is specified to an accurate destination. In FIG. 3, while the relay apparatus C directly forwards the received packet to the machine B without converting the first hierarchical address, the relay apparatus C may convert the first hierarchical address to restore the original content.

First Exemplary Embodiment

Figure 4:
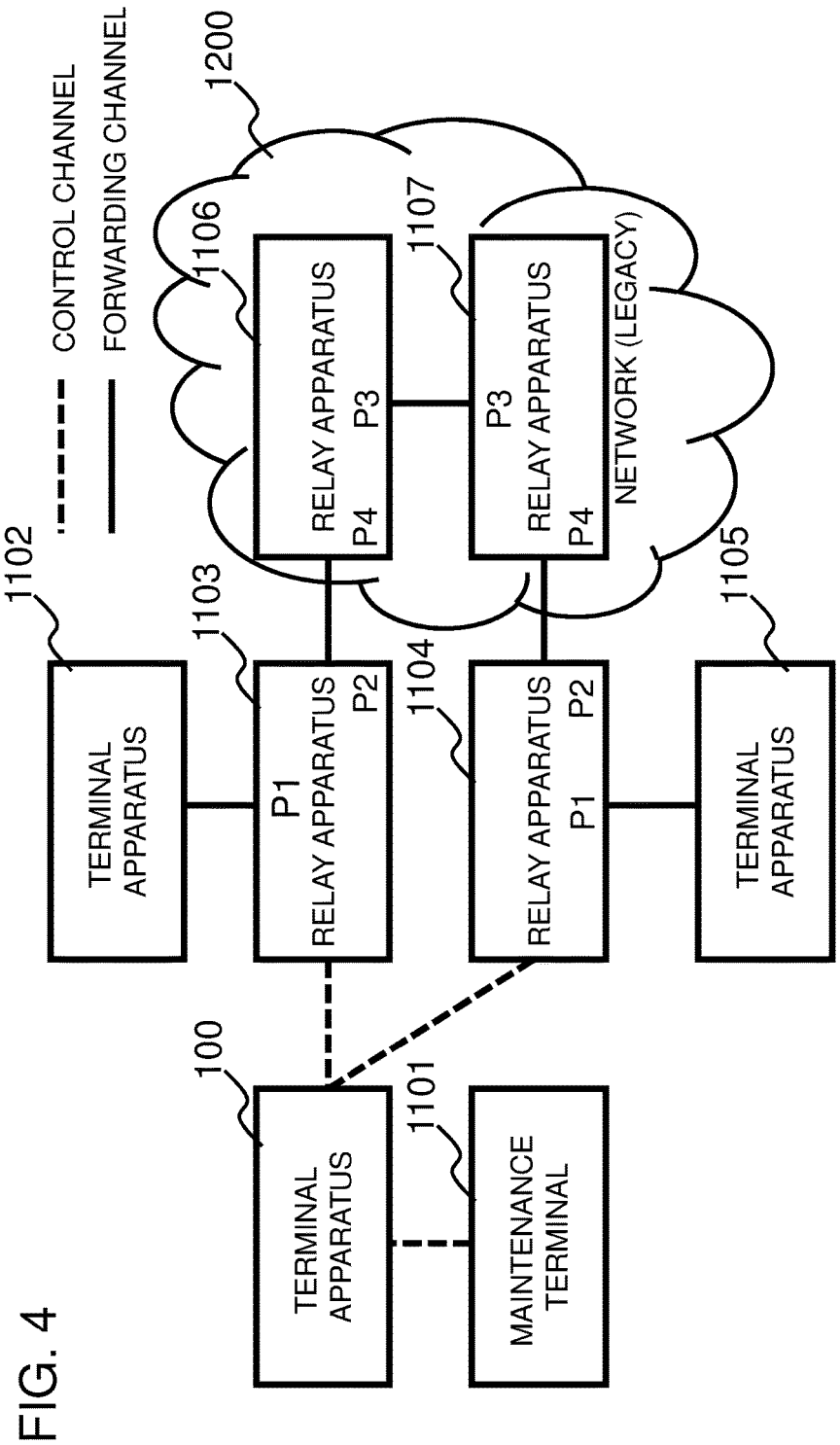
FIG. 4 illustrates a configuration of a communication system according to a first exemplary embodiment of the present disclosure.

Next, a first exemplary embodiment of the present disclosure will be described in detail with reference to the drawings. FIG. 4 illustrates a configuration of a communication system according to the first exemplary embodiment of the present disclosure. As illustrated in FIG. 4, the communication system includes a legacy network 1200 that includes the relay apparatuses 1106 and 1107, relay apparatuses 1103 and 1104 that are arranged at endpoints of the legacy network 1200, and a control apparatus 100 that controls the relay apparatuses 1103 and 1104 by setting control information (flow entries) in the relay apparatuses 1103 and 1104. In addition, the relay apparatuses 1103 and 1104 are connected to terminal apparatuses 1102 and 1105, respectively. In addition, the control apparatus 100 is connected to a maintenance terminal 1101 that manages legacy information, etc. stored in the control apparatus 100.

In FIG. 4, solid lines represent forwarding channels for forwarding user data, etc. and dashed line represent control channels for exchanging control messages. In addition, reference characters P1 to P4 in the boxes indicating the relay apparatuses 1103, 1104, 1106, and 1107 represent port numbers of the relay apparatuses.

For example, the relay apparatuses 1103 and 1104 can be configured by OpenFlow switches according to NPLs 1 and 2 that operate in accordance with control information set by the control apparatus 100.

For example, the relay apparatuses 1106 and 1107 are L2 switches that are not controlled by the control apparatus 100. For example, each of the relay apparatuses 1106 and 1107 has an address table in which ports and destination L2 addresses are associated with each other and transmits a received packet from a port corresponding to the L2 address of the received packet. In addition, when receiving a packet, each of the relay apparatuses 1106 and 1107 performs a destination learning operation with the address table. The legacy network 1200 includes relay apparatuses such as these L2 switches that are not controlled by the control apparatus 100. The legacy network 1200 is a network that is not controlled by the control apparatus 100.

The terminal apparatuses 1102 and 1105 can be any type of terminal apparatuses that are used by users. The present exemplary embodiment will be described by using an example in which communication is performed between the terminal apparatuses 1102 and 1105. However, any node other than the terminal apparatus(es) may be used as a communication peer(s). For example, the present exemplary embodiment is also applicable to when a terminal apparatus communicates with any type of server or when machines communicate with each other. In addition, the present exemplary embodiment is applicable to so-called M2M communication.

Figure 5:
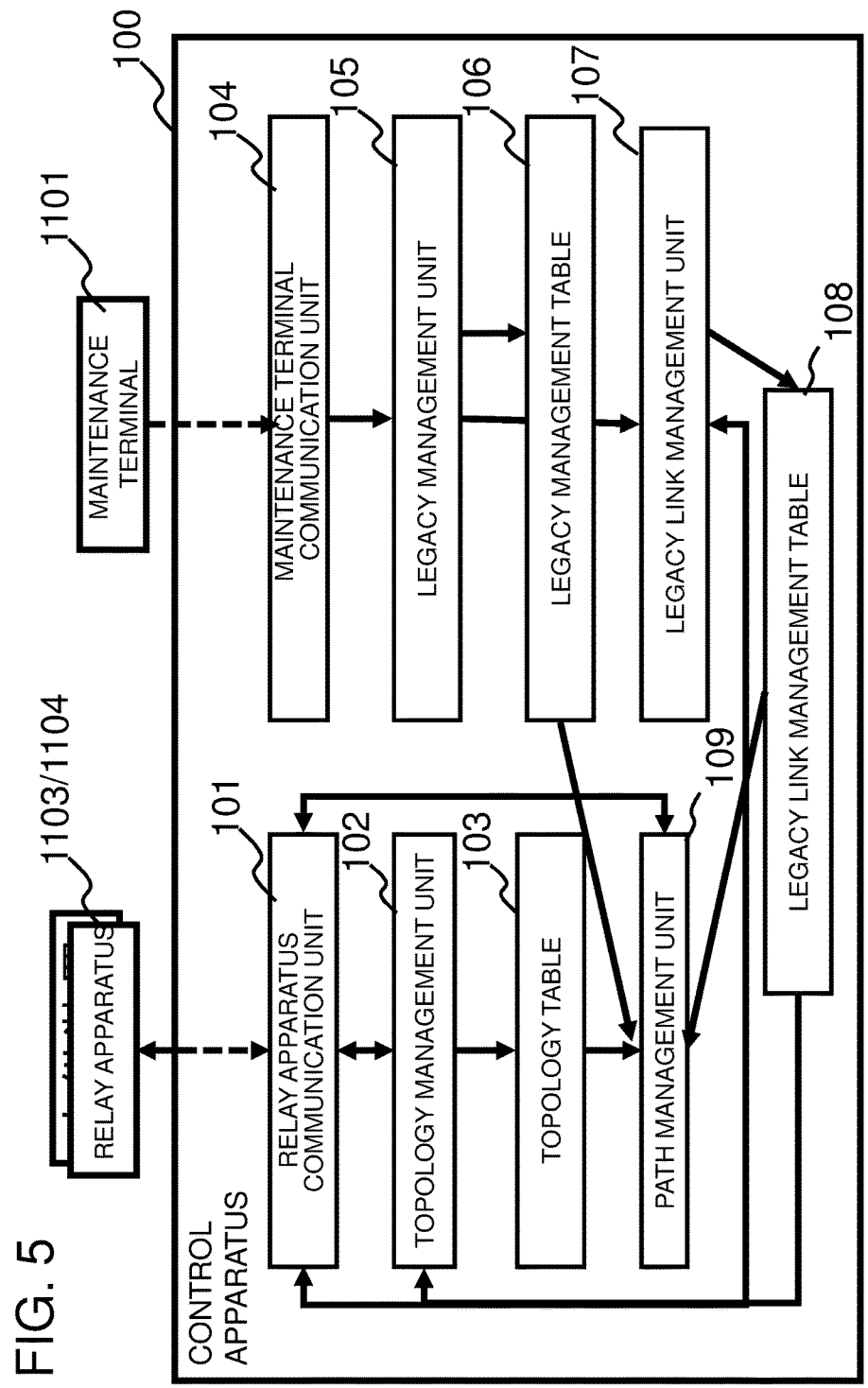
FIG. 5 illustrates an exemplary configuration of a control apparatus in the communication system according to the first exemplary embodiment of the present disclosure.

FIG. 5 illustrates an exemplary configuration of the above control apparatus 100. As illustrated in FIG. 5, the control apparatus 100 includes a relay apparatus communication unit 101, a topology management unit 102, a topology table 103, a maintenance terminal communication unit 104, a legacy management unit 105, a legacy management table 106, a legacy link management unit 107, a legacy link management table 108, and a path management unit 109.

The relay apparatus communication unit 101 transmits messages about control information (flow entries) set in the relay apparatuses 1103 and 1104 to the relay apparatuses 1103 and 1104. In addition, the relay apparatus communication unit 101 receives messages about requests for the control information from the relay apparatuses 1103 and 1104. In addition, the relay apparatus communication unit 101 instructs the relay apparatuses 1103 and 1104 to transmit topology check packets and receives reply packets in response to the topology check packets from the relay apparatuses 1103 and 1104. The OpenFlow protocol according to NPL 2 can be used to exchange messages with the relay apparatuses 1103 and 1104.

The topology management unit 102 manages a topology table 103 illustrated in FIG. 6 on the basis of the results of the topology check packets transmitted from the relay apparatuses 1103 and 1104. Processing for updating the topology table 103 will be described in detail below.

The maintenance terminal communication unit 104 transmits an input screen for legacy connection port information and legacy determination information to the maintenance terminal 1101. When receiving input of legacy connection port information and legacy determination information from a user, the maintenance terminal communication unit 104 forwards the information to the legacy management unit 105.

The legacy management unit 105 manages information about the legacy network connected to the relay apparatuses 1103 and 1104 controlled by the control apparatus 100.

FIG. 7 illustrates an exemplary configuration of the legacy management table 106. The legacy management table 106 in FIG. 7 stores an entry in which legacy network determination information ("1200," which is the same as the reference character of the legacy network, is set in FIG. 7), a determination VLAN (Virtual Local Area Network) ID, connection ports of the relay apparatuses 1103 and 1104 controlled by the control apparatus 100 are associated with each other. In addition, in FIG. 7, a value "3000" is set as the determination VLAN (ID) and ports P2 of the relay apparatuses 1103 and 1104 are set as the connection ports as illustrated in FIG. 4. Namely, the entry in FIG. 7 indicates that a legacy network, which has determination information 1200 and to which VLAN ID "3000" is allocated, is connected to ports P2 of the relay apparatuses 1103 and 1104.

For example, when a new entry is added to the legacy management table 106 or when an existing entry in the legacy management table 106 is changed, the legacy link management unit 107 reads connection port information from the corresponding entry in the legacy management table 106, to manage information about a link connected to the legacy network (hereinafter referred to as a "legacy link"). The legacy link management unit 107 corresponds to the specific links management unit. In addition, the legacy link can be expressed as "a virtual link between relay apparatuses connected via the legacy network."

FIG. 8 illustrates an exemplary configuration of the legacy link management table 108. For example, the legacy link management table 108 in FIG. 8 stores an entry in which one of the connection ports read from the legacy management table 106, a MAC address (Media Access Control Address) of this port, and a connection status of this port are associated with each other. The MAC addresses of the relay apparatuses 1103 and 1104 can be acquired by querying the relay apparatuses 1103 and 1104. The connection statuses can be detected on the basis of the transmission results of the following legacy link establishment packets.

The path management unit 109 refers to the topology table 103 and the legacy management table 106 to calculate and manage a path formed by the relay apparatuses controlled by the control apparatus 100. In addition, the path management unit 109 generates control information for causing the relay apparatuses on the calculated path to forward packets on the path and causes the relay apparatus communication unit 101 to set the control information.

For example, the above control apparatus 100 can be realized by adding a function of managing a legacy network and a function of determining a packet conversion content in view of the legacy network to the OpenFlow controller in NPLs 1 and 2. In addition, each unit (processing means) of the control apparatus 100 illustrated in FIG. 5 can be realized by a computer program which causes a computer that constitutes the control apparatus 100 to use its hardware and execute the above processing.

Next, an operation according to the present exemplary embodiment will be described in detail with reference to the drawings.

(Establishment of Topology)

Figure 9:
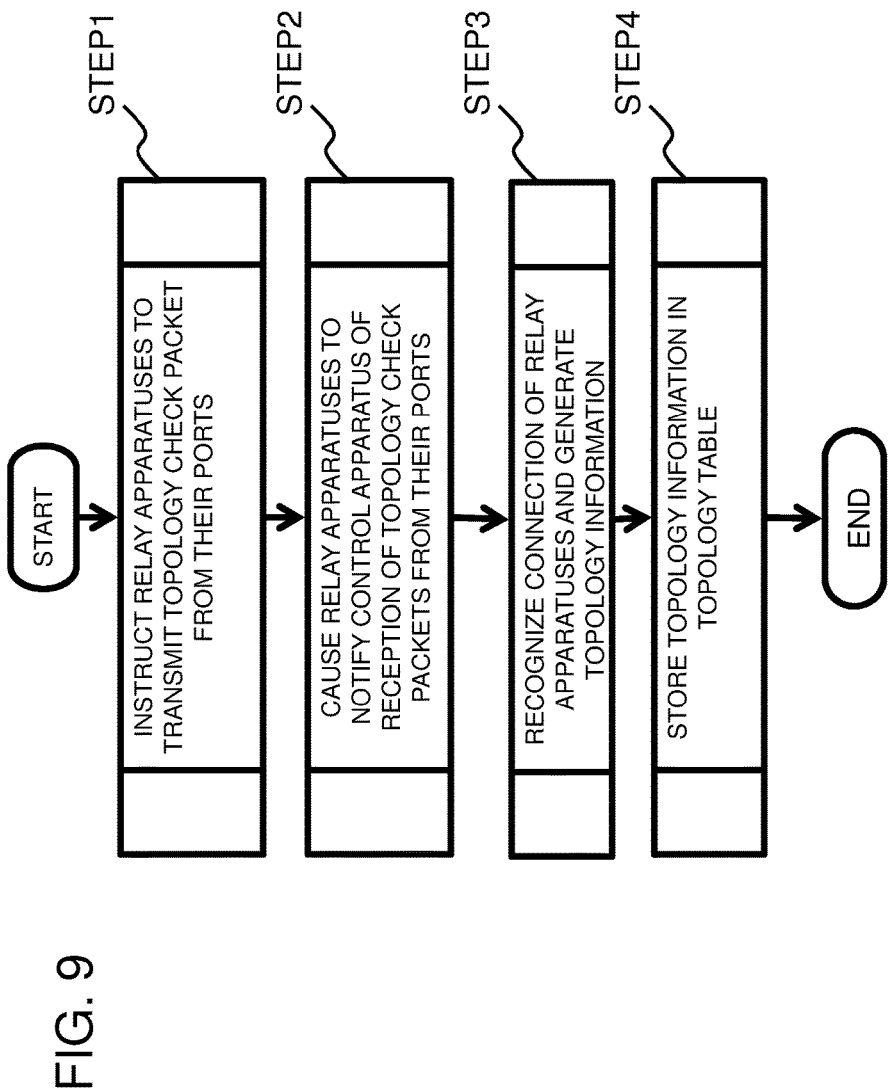
FIG. 9 is a flowchart illustrating a topology establishment operation performed by the control apparatus in the communication system according to the first exemplary embodiment of the present disclosure.

First, a topology establishment operation performed by the control apparatus 100 will be described. FIG. 9 is a flowchart for illustrating a topology collection operation performed by the control apparatus 100.

As illustrated in FIG. 9, first, the control apparatus 100 instructs the relay apparatuses 1103 and 1104 to transmit a topology check packet from each port of the relay apparatuses 1103 and 1104 (STEP1). A routing protocol packet such as an OSPF (Open Shortest Path First) packet or an LLDP (Link Layer Discovery Protocol) packet can be used as the topology check packet. In addition, for example, a Packet-Out message in NPL 2 can be used as the packet output instruction transmitted from the control apparatus 100 to the relay apparatuses 1103 and 1104.

When receiving these topology check packets from other relay apparatuses, the relay apparatuses 1103 and 1104 notify the control apparatus 100 of the reception of the topology check packets and of the reception ports (STEP2). In addition, for example, the relay apparatuses 1103 and 1104 can use a Packet-In message in NPL 2 when notifying the control apparatus 100 of the received packets.

On the basis of the information from the relay apparatuses 1103 and 1104 that have received the topology check packets, the control apparatus 100 recognizes that the relay apparatuses that have received the topology check packets are connected to each other and generates topology information (STEP3). FIG. 6 illustrates a status obtained after the topology check packets are transmitted. As illustrated in FIG. 4, the topology check packets transmitted from ports P1 and P2 of the relay apparatuses 1103 and 1104 are received by the terminals 1102 and 1105 or the relay apparatuses 1106 and 1107 in the legacy network. Since these apparatuses do not notify the control apparatus 100 of reception of a topology check packet, the control apparatus 100 recognizes no relay apparatus that neighbors each port of the relay apparatuses and sets "N/A," for example. Next, the control apparatus 100 stores the topology information generated in STEP3 in the topology table 103 (STEP4).

(Acquisition of Legacy Network Information)

Figure 10:
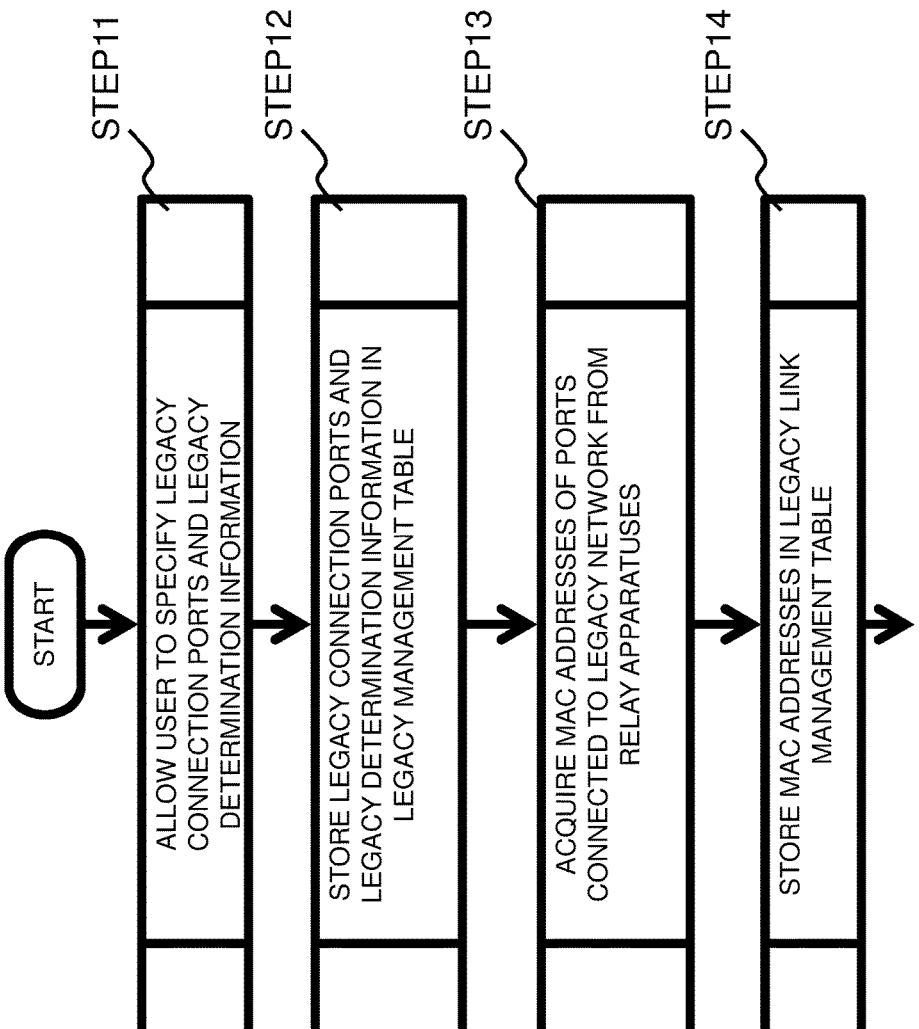
FIG. 10 is a flowchart illustrating an operation performed by the control apparatus when information about a legacy network is set in the communication system according to the first exemplary embodiment of the present disclosure.
Figure 11:
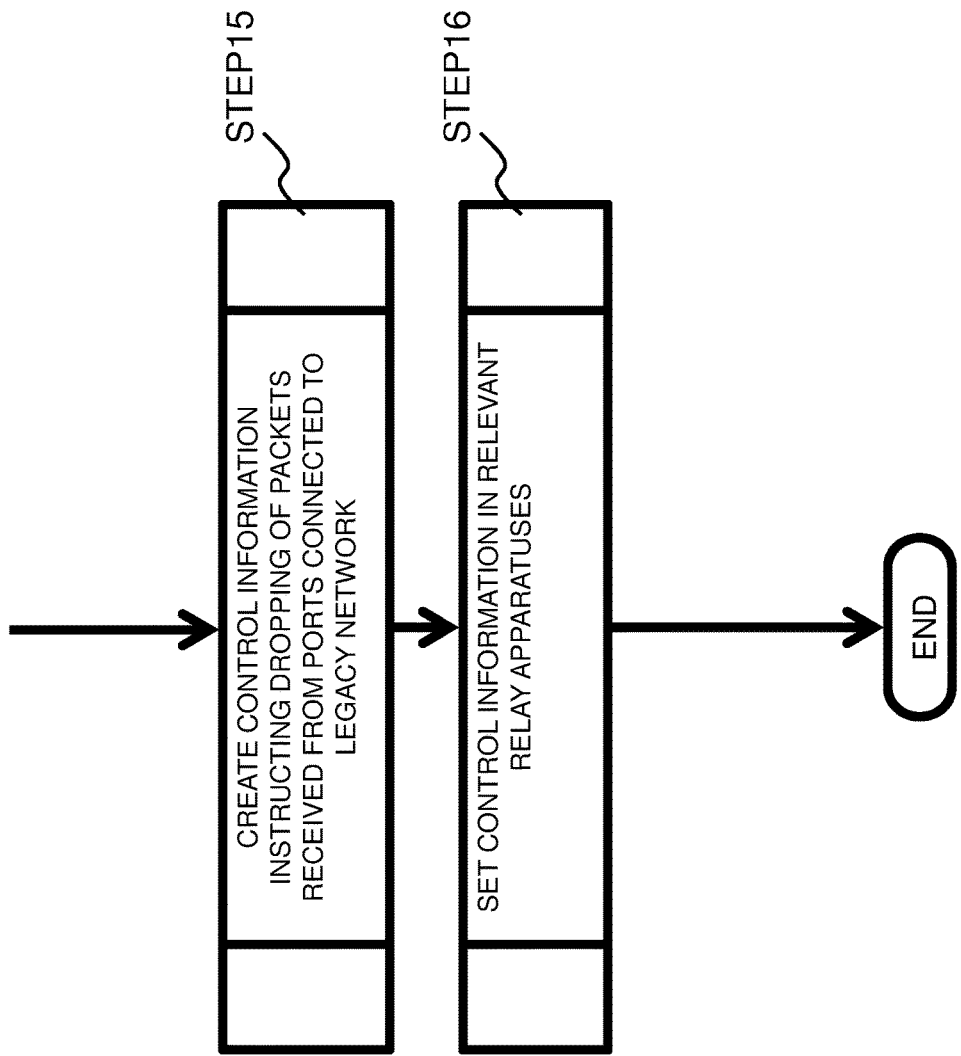
FIG. 11 is a flowchart that follows the flowchart in FIG. 10.

Next, a legacy network information acquisition operation performed by the control apparatus 100 will be described. FIGS. 10 and 11 are flowcharts illustrating an operation performed by the control apparatus 100 when information about a legacy network is set by a user.

As illustrated in FIG. 10, first, a user specifies legacy determination information, a determination VLAN, and connection port information via the maintenance terminal 1101 (STEP11). This example assumes that the user has specified that the legacy determination information is 1200, the determination VLAN is 3000, and the connection port information is P2 of the relay apparatus 1103 and P2 of the relay apparatus 1104, as illustrated in FIG. 7.

After receiving the information from the maintenance terminal 1101, the control apparatus 100 stores these items of information in the legacy management table 106 illustrated in FIG. 7 (STEP12).

Next, the control apparatus 100 acquires the MAC addresses of the ports specified in the connection port information in the entry newly registered in the legacy management table 106 from the respective relay apparatuses 1103 and 1104 (STEP13). Next, the control apparatus 100 stores these items of information in the legacy link management table 108 illustrated in FIG. 8 (STEP14). This example assumes that MAC-A and MAC-B have been acquired as the MAC addresses of port P2 of the relay apparatuses 1103 and 1104, respectively, and that the MAC addresses have been associated with the respective port information and then stored, as illustrated in FIG. 8.

Next, the control apparatus 100 creates control information that instructs dropping of packets that are received from the ports connected to the legacy network (STEP15 in FIG. 11).

FIG. 12 illustrates exemplary control information created on the basis of the entries in the legacy link management table 108 illustrated in FIG. 8. The top two entries in FIG. 12 illustrate exemplary control information set in the relay apparatus 1103. The control information in FIG. 12 is listed in ascending order of priority. Namely, when receiving a packet whose source MAC address (SMAC) is MAC-B (the MAC address of port P2 of the relay apparatus 1104) from port P2, the relay apparatus 1103 drops the packet. In addition, the control information including "N/A" as the match condition defines a processing content performed when none of the higher-priority control information is applicable. Thus, when receiving other packets from port P2, the relay apparatus 1103 also drops such packets.

Likewise, the bottom two entries in FIG. 12 illustrate exemplary control information set in the relay apparatus 1104. When receiving a packet whose source MAC address (SMAC) is MAC-A (the MAC address of port P2 of the relay apparatus 1103) from port P2, the relay apparatus 1104 drops the packet. In addition, control information including "N/A" as the match condition is also set in the relay apparatus 1104. Thus, when receiving other packets from port P2, the relay apparatus 1104 drops the packets.

Next, the control apparatus 100 sets the control information created as described above in the relay apparatuses 1103 and 1104 (STEP16 in FIG. 11).

(Updating of Topology by Using Information About Legacy Network)

Figure 13:
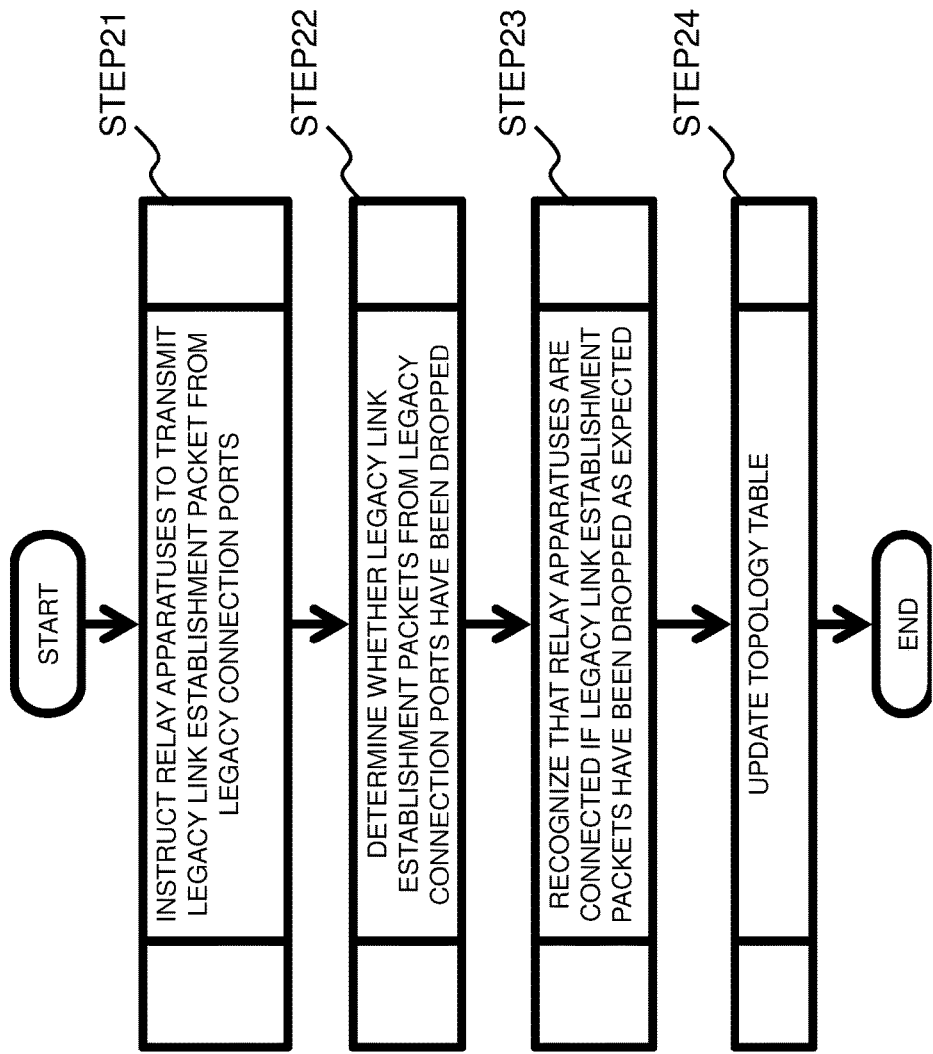
FIG. 13 is a flowchart illustrating a topology update operation performed by the control apparatus in the communication system according to the first exemplary embodiment of the present disclosure.

Next, an operation of updating the topology by using information about the legacy network performed by the control apparatus 100 will be described. FIG. 13 is a flowchart for illustrating a topology update operation performed by the control apparatus according to the present exemplary embodiment.

The control apparatus 100 instructs the relay apparatuses 1103 and 1104 to transmit a legacy link establishment packet from their respective legacy connection ports (STEP21). The same packet as the above topology check packet can be used as the legacy link establishment packet. In addition, through these legacy link establishment packets, the relay apparatuses 1106 and 1107 in the legacy network perform learning with their respective address tables.

When receiving legacy link establishment packets from other relay apparatuses via the legacy network 1200, the relay apparatuses 1103 and 1104 drop these legacy link establishment packets in accordance with the control information set in STEP16 in FIG. 11. The control apparatus 100 determines whether the legacy link establishment packets have been dropped by querying the relay apparatuses 1103 and 1104 whether the relay apparatuses 1103 and 1104 have dropped such legacy link establishment packets (STEP22).

If, as a result of the determination, the control apparatus 100 determines that legacy link establishment packets have been dropped as expected, the control apparatus 100 recognizes that the relay apparatuses 1103 and 1104 are connected via the legacy network 1200 (STEP23).

Next, the control apparatus 100 updates the topology table 103 (STEP24). FIG. 14 illustrates the updated topology table. As illustrated in FIG. 14, the neighboring relay apparatus 1104 and port information P2 corresponding thereto are added as the link information about port P2 of the relay apparatus 1103. Likewise, the neighboring relay apparatus 1103 and port information P2 corresponding thereto are added as the link information about port P2 of the relay apparatus 1104.

Next, an operation performed when the control apparatus 100 cannot determine that the legacy link establishment packets have been dropped in STEP22 in FIG. 13 will be described.

Figure 15:
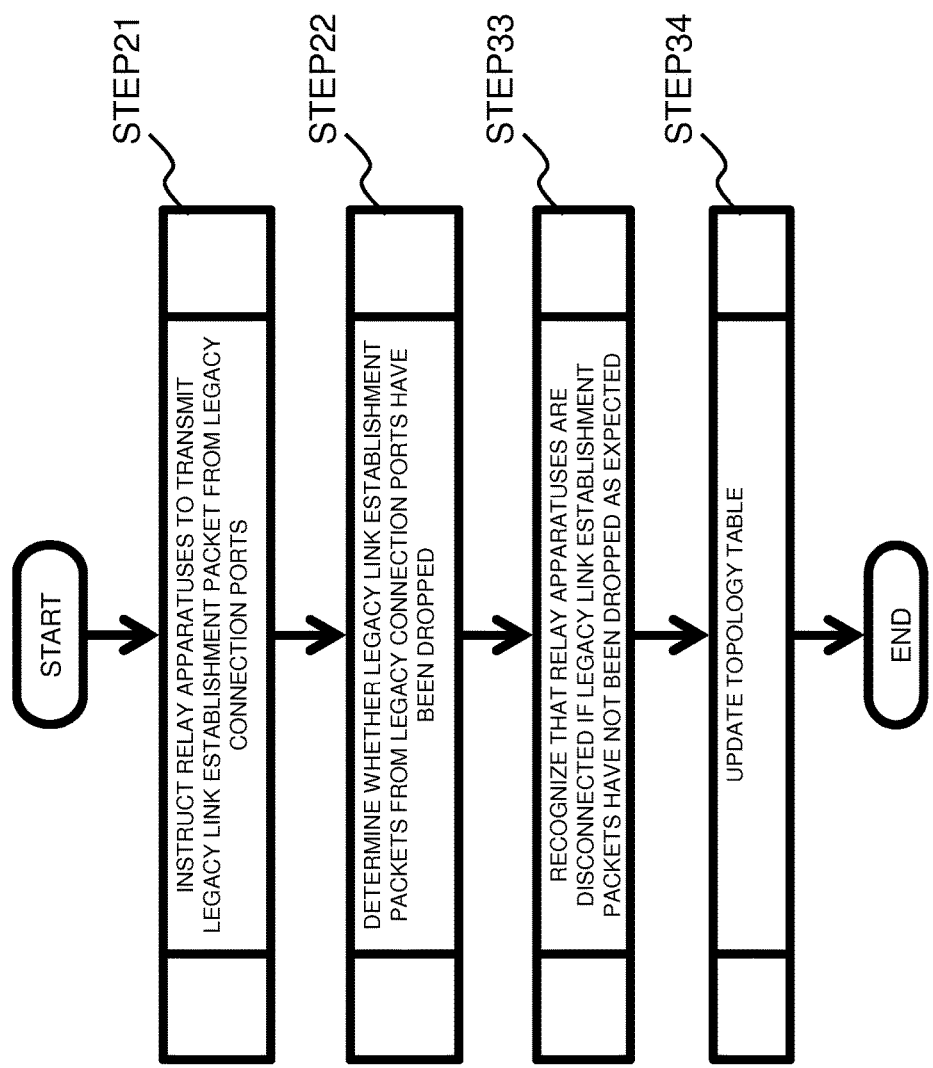
FIG. 15 is another flowchart illustrating the topology update operation performed by the control apparatus in the communication system according to the first exemplary embodiment of the present disclosure.

FIG. 15 is a flowchart for illustrating an operation performed when the control apparatus 100 cannot determine that the legacy link establishment packets have been dropped. STEP21 and STEP22 in FIG. 15 are the same as STEP21 and STEP22 in FIG. 13. If, as a result of the determination in STEP22, the control apparatus 100 cannot determine that the legacy link establishment packets have been dropped, the control apparatus 100 recognizes that the link between the relay apparatuses 1103 and 1104 is disconnected (STEP33).

Next, the control apparatus 100 updates the topology table 103 (STEP34). After updated, as illustrated in FIG. 6, the neighboring relay apparatuses and the port information have been deleted from the link information about port P2 of the relay apparatuses 1103 and 1104 in the topology table 103.

(Forwarding of User Packet)

Figure 16:
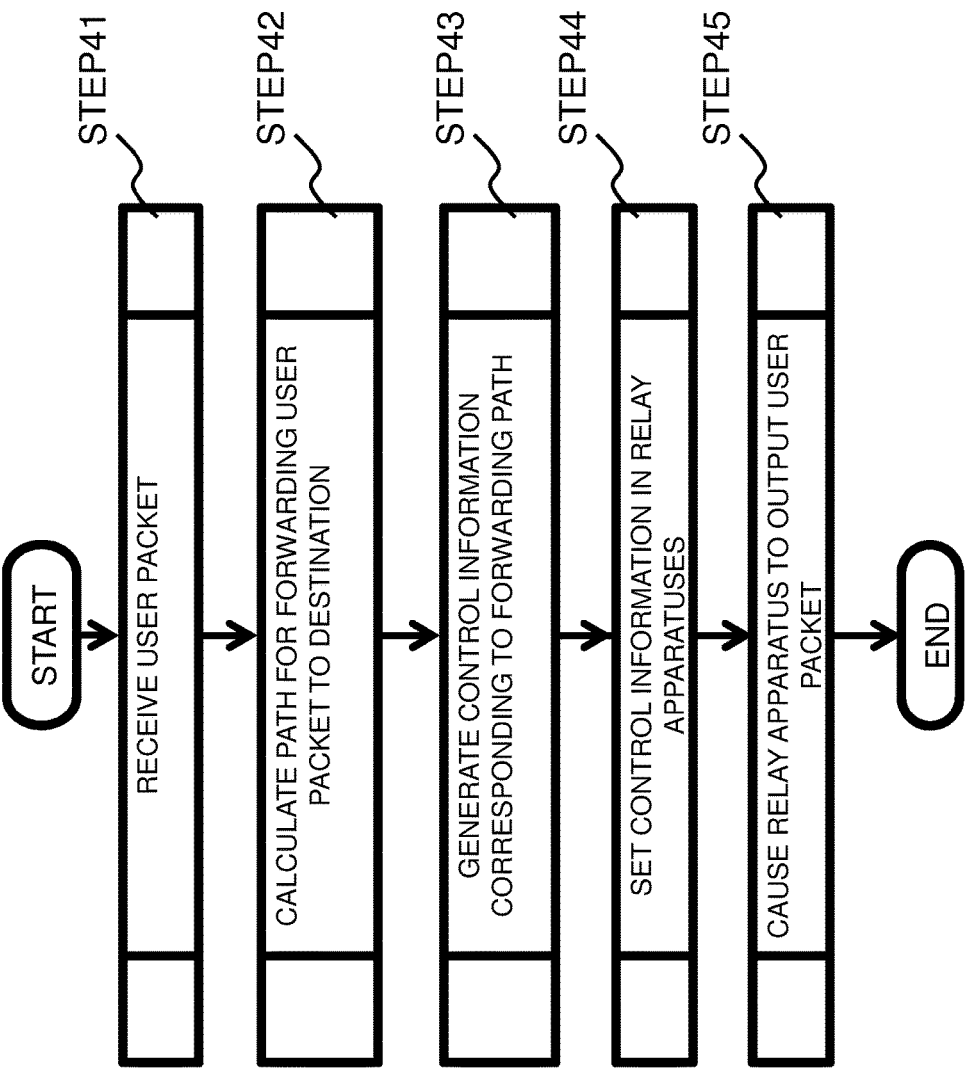
FIG. 16 is a flowchart illustrating a user packet forwarding operation in the communication system according to the first exemplary embodiment of the present disclosure.

Next, a user packet forwarding operation by using the topology grasped as described above will be described. FIG. 16 is a flowchart for illustrating a user packet forwarding operation in the communication system according to the first exemplary embodiment of the present disclosure.

As illustrated in FIG. 16, first, the terminal apparatus 1102 (1105) transmits a packet addressed to the terminal apparatus 1105 (1102) (hereinafter referred to as a "user packet"). When receiving the user packet, the relay apparatus 1103 (1104) searches the control information set by the control apparatus 100 for control information having a match condition matching the user packet. However, at this point, as illustrated in FIG. 12, no control information for processing the user packet is set. Thus, the relay apparatus 1103 (1104) forwards the user packet to the control apparatus 100 to request setting of control information. When receiving the user packet from the relay apparatus 1103 (1104) (STEP41), the control apparatus 100 refers to the topology table 103 and calculates a forwarding path for forwarding the user packet to the destination (STEP42).

Since the control apparatus 100 has already grasped the entire topology including the legacy network as illustrated in FIG. 4 through the above topology establishment or updating, the control apparatus 100 calculates a path so that the packet from the terminal apparatus 1102 to the terminal apparatus 1105 is forwarded via the relay apparatus 1103, the legacy network 1200, and the relay apparatus 1104 in this order, for example.

Next, the control apparatus 100 generates control information for causing the relay apparatuses on the calculated forwarding path to forward the packet on the forwarding path (STEP43). For example, the control apparatus 100 sets control information, which causes the relay apparatus 1103 to forward the packet from the terminal apparatus 1102 from port P2, in the relay apparatus 1103. In addition, the control apparatus 100 sets control information, which causes the relay apparatus 1104 to forward the packet that is received from port P2 (from the legacy network) and that is addressed to the terminal apparatus 1105 from port 1, in the relay apparatus 1104.

Next, the control apparatus 100 sets the generated control information in the relay apparatuses 1103 and 1104 on the forwarding path (STEP44). In addition, the control apparatus 100 instructs the relay apparatus 1104 to output the packet received by the relay apparatus 1103 in STEP41 (STEP45).

In this way, the subsequent packets transmitted from the terminal apparatus 1102 to the terminal apparatus 1105 are forwarded to the terminal apparatus 1105 in accordance with the control information set in the relay apparatuses 1103 and 1104.

FIG. 17 illustrates exemplary control information set in the relay apparatus 1103. The entries indicated by "Added" on the left side in FIG. 17 are the control information added for processing the user packets. The third entry from the top includes match conditions indicating that the source MAC address (SMAC) is the MAC address of the terminal apparatus 1102 and the destination MAC address (DMAC) is the MAC address of the terminal apparatus 1105. The third entry also includes actions (Action) for causing, if the relay apparatus 1103 receives a packet that matches these match conditions, the relay apparatus 1103 to convert the SMAC into MAC-A (the MAC address of port P2 of the relay apparatus 1103), convert the DMAC into MAC-B (the MAC address of port P2 of the relay apparatus 1104), add VLAN ID 3000, and forward the packet from port P2. In addition, in FIG. 17, control information for processing a reply packet from the terminal apparatus 1105 to the terminal 1102 is also set. The fourth entry from the top includes actions (Action) for causing, if the relay apparatus 1103 receives a packet that matches a match condition indicating that the destination MAC address (DMAC) is MAC-A (the MAC address of port P2 of the relay apparatus 1103), the relay apparatus 1103 to restore the SMAC and the DMAC, delete the VLAN ID, and forward the packet from port P1.

FIG. 18 illustrates exemplary control information set in the relay apparatus 1104. The entries indicated by "Added" on the left side in FIG. 18 are the control information added for processing the user packets. The third entry from the top includes match conditions for processing reply packets from the terminal apparatus 1105 to the terminal 1102. More specifically, the match conditions indicate that the source MAC address (SMAC) is the MAC address of the terminal apparatus 1105 and the destination MAC address (DMAC) is the MAC address of the terminal apparatus 1102. The third entry also includes actions (Action) for causing, if the relay apparatus 1104 receives a packet that matches these match conditions, the relay apparatus 1104 to convert the SMAC into MAC-B (the MAC address of port P2 of the relay apparatus 1104), convert the DMAC into MAC-A (the MAC address of port P2 of the relay apparatus 1103), add VLAN ID 3000, and forward the packet from port P2. In addition, the fourth entry from the top is the control information for processing packets from the terminal apparatus 1102 to the terminal 1105. The fourth entry includes actions (Action) for causing, if the relay apparatus 1104 receives a packet that matches a match condition indicating that the destination MAC address (DMAC) is MAC-B (the MAC address of port P2 of the relay apparatus 1104), the relay apparatus 1104 to restore the SMAC and the DMAC, delete the VLAN ID, and forward the packet from port P2.

Consequently, bidirectional packet forwarding via the legacy network 1200 is realized as illustrated in FIG. 19. For example, the entry-side relay apparatus 1103 rewrites the MACs of the packet transmitted from the terminal apparatus 1102 to the terminal 1105 so that the packet is forwarded accurately in the legacy network. The exit-side relay apparatus 1104 restores the MACs. In addition, as illustrated in FIGS. 17 and 18, only two control information entries are set in each of the relay apparatuses, and the control apparatus 100 receives a query (a control information setting request) only when a relay apparatus receives the first packet. Thus, the load is not increased on the control apparatus 100 and the relay apparatuses 1103 and 1104. In addition, the resource use amounts are not increased either.

Next, second to fifth exemplary embodiments of the present disclosure will be described. The second to fifth exemplary embodiments of the present disclosure differ from the first exemplary embodiment in the positional relationship between at least one network including the relay apparatuses controlled by the control apparatus 100 and the other network(s) (a legacy network(s)). No particular difference is made to the configuration of the control apparatus 100. Hereinafter, the exemplary embodiments will be described with a focus on differences.

Second Exemplary Embodiment

Figure 20:
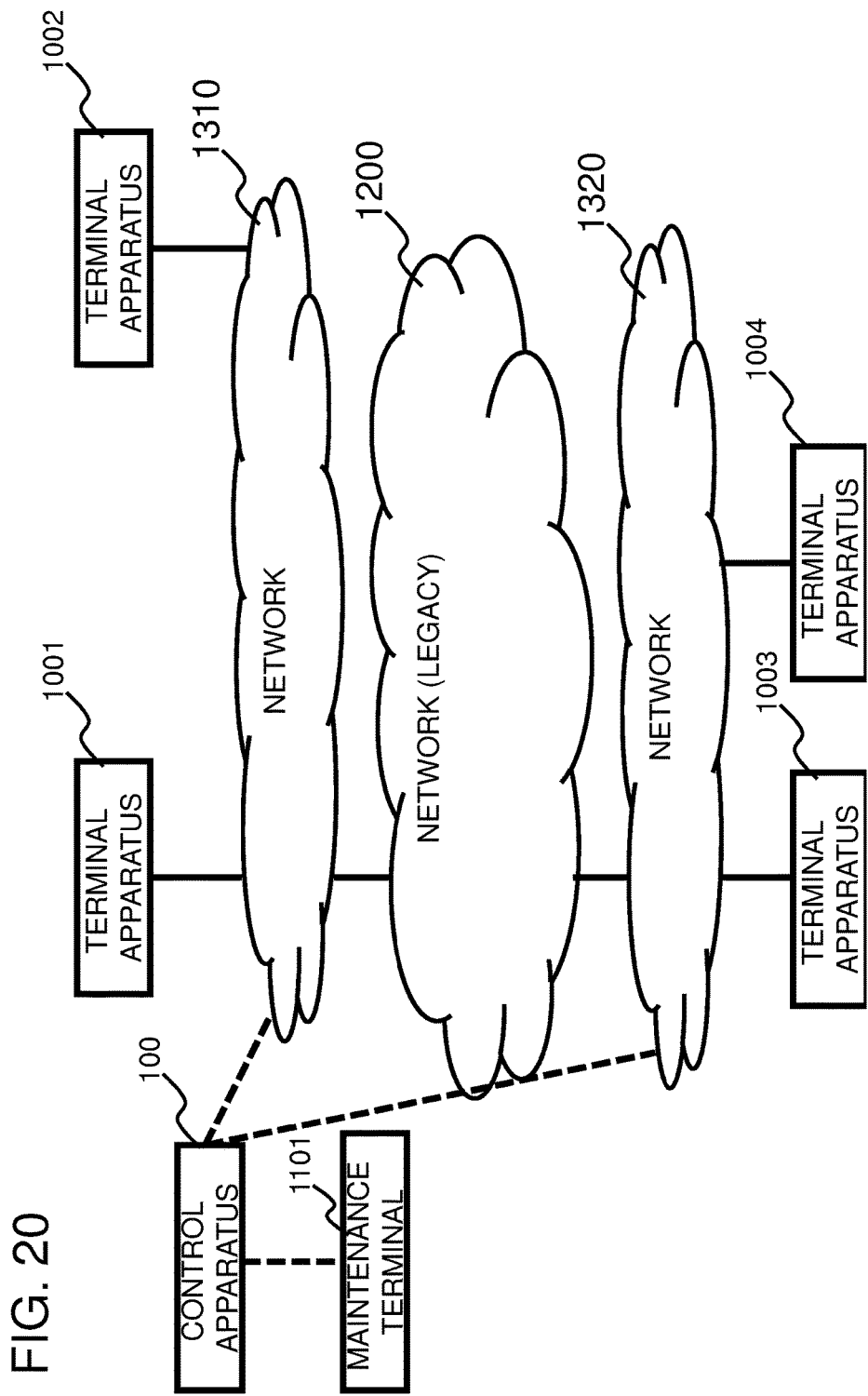
FIG. 20 illustrates a configuration of a communication system according to a second exemplary embodiment of the present disclosure.

FIG. 20 illustrates a configuration of a communication system according to the second exemplary embodiment of the present disclosure. The second exemplary embodiment differs from the first exemplary embodiment illustrated in FIG. 4 in that a legacy network 1200 is arranged between networks 1310 and 1320 including relay apparatuses controlled by the control apparatus 100 and that terminal apparatuses 1001 to 1004 communicate with each other via these networks.

Figure 21:
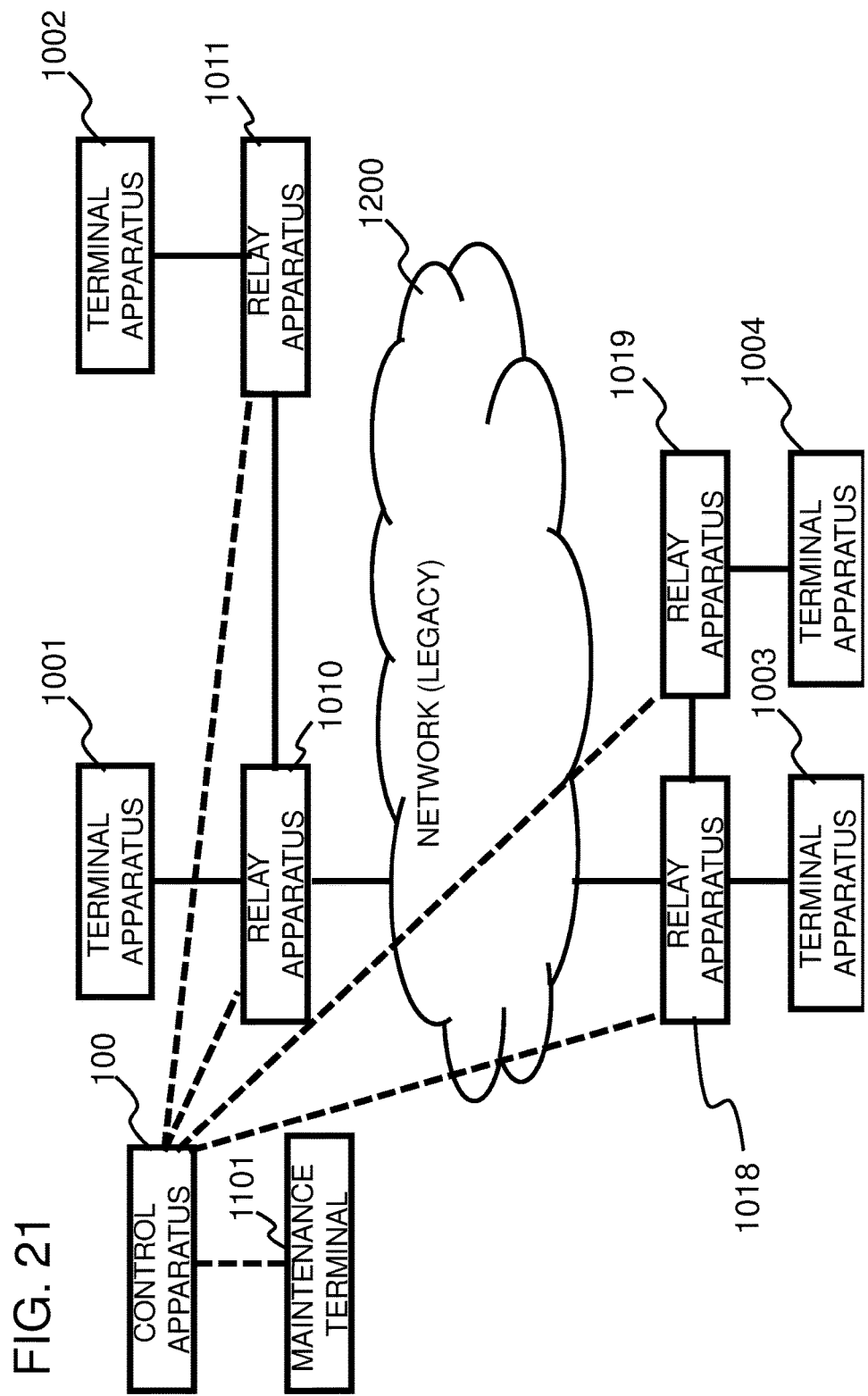
FIG. 21 illustrates another configuration of the communication system according to the second exemplary embodiment of the present disclosure.

FIG. 21 illustrates a network topology grasped by transmitting topology check packets in the same way as described in the first exemplary embodiment. As illustrated in FIG. 21, relay apparatuses 1010 and 1011 correspond to the relay apparatus 1103 according to the first exemplary embodiment and relay apparatuses 1018 and 1019 correspond to the relay apparatus 1104 according to the first exemplary embodiment. The basic configuration is not different except that the relay apparatuses 1010, 1011, 1018, and 1019 are connected to the terminal apparatuses 1001 to 1004, respectively.

Figure 22:
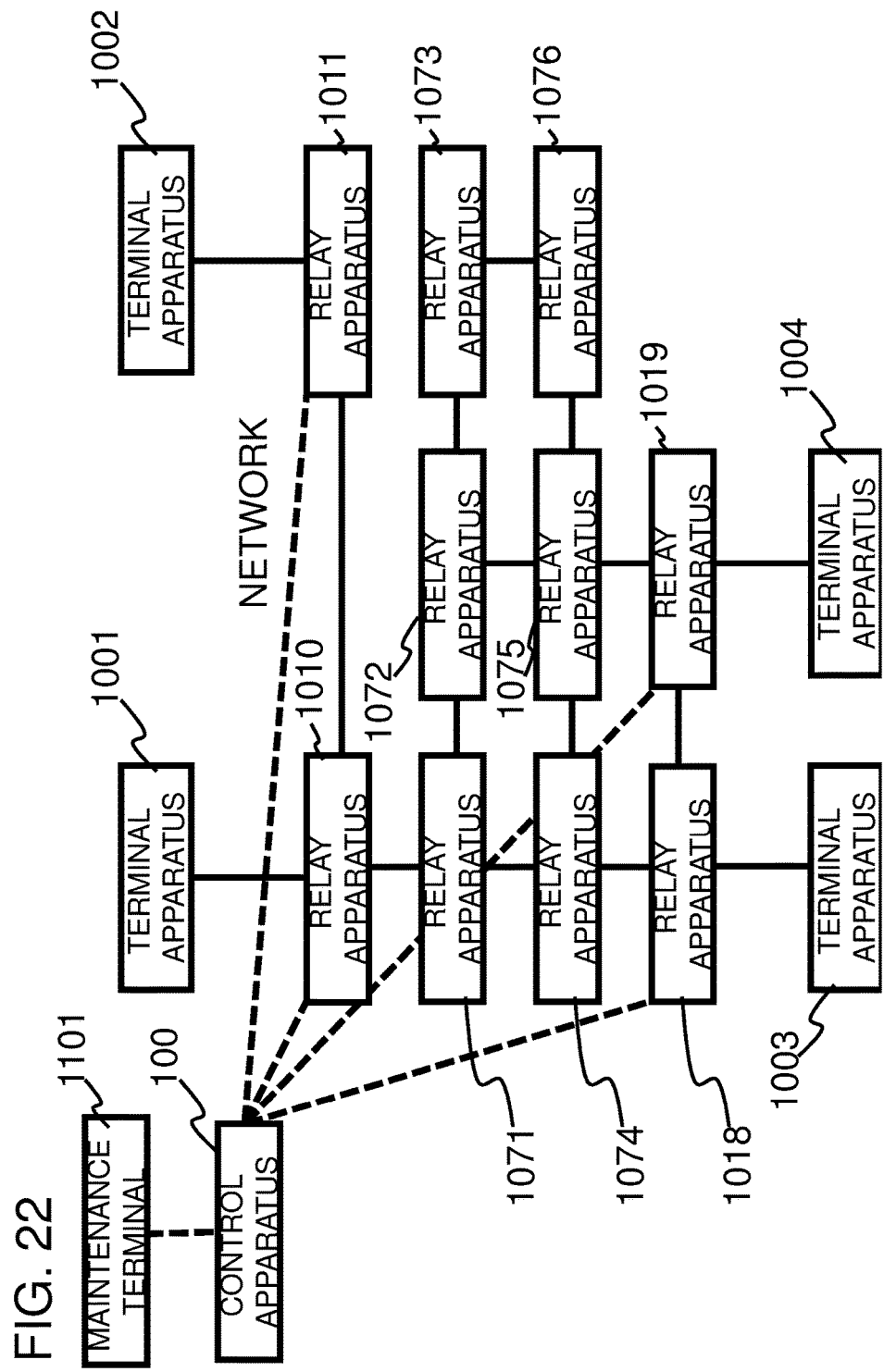
FIG. 22 illustrates still another configuration of the communication system according to the second exemplary embodiment of the present disclosure.

FIG. 22 illustrates a network topology grasped by transmitting legacy link establishment packets in the same way as described in the first exemplary embodiment. Through the transmission of the legacy link establishment packets, relay apparatuses 1071 to 1076 learn a correspondence relationship among their own ports and the MAC addresses of the legacy connection ports of the relay apparatuses 1010, 1011, 1018, and 1019. In addition, the control apparatus 100 grasps the link statuses among the relay apparatuses 1010, 1011, 1018, and 1019. In this way, as in the first exemplary embodiment, the entry-side relay apparatuses in the legacy network are provided with control information for rewriting necessary headers of a packet and forwarding the packet to the legacy network. In addition, the exit-side relay apparatuses in the legacy network are provided with control information for restoring the headers of the packet and forwarding the packet. As a result, the relay apparatuses having a port connected to the legacy network rewrite (restore) the necessary headers of the packets exchanged among the terminal apparatuses 1001 to 1004. The packets transmitted beyond the legacy network are forwarded to a destination communication terminal(s) as instructed by the control apparatus 100.

As described above, the present disclosure is applicable not only to a network configuration in which terminal apparatuses and relay apparatuses are arranged on a one-on-one basis as illustrated in FIG. 4 but also to a network configuration in which each of a plurality of relay apparatuses controlled by the control apparatus 100 is connected to a terminal apparatus.

Third Exemplary Embodiment

Figure 23:
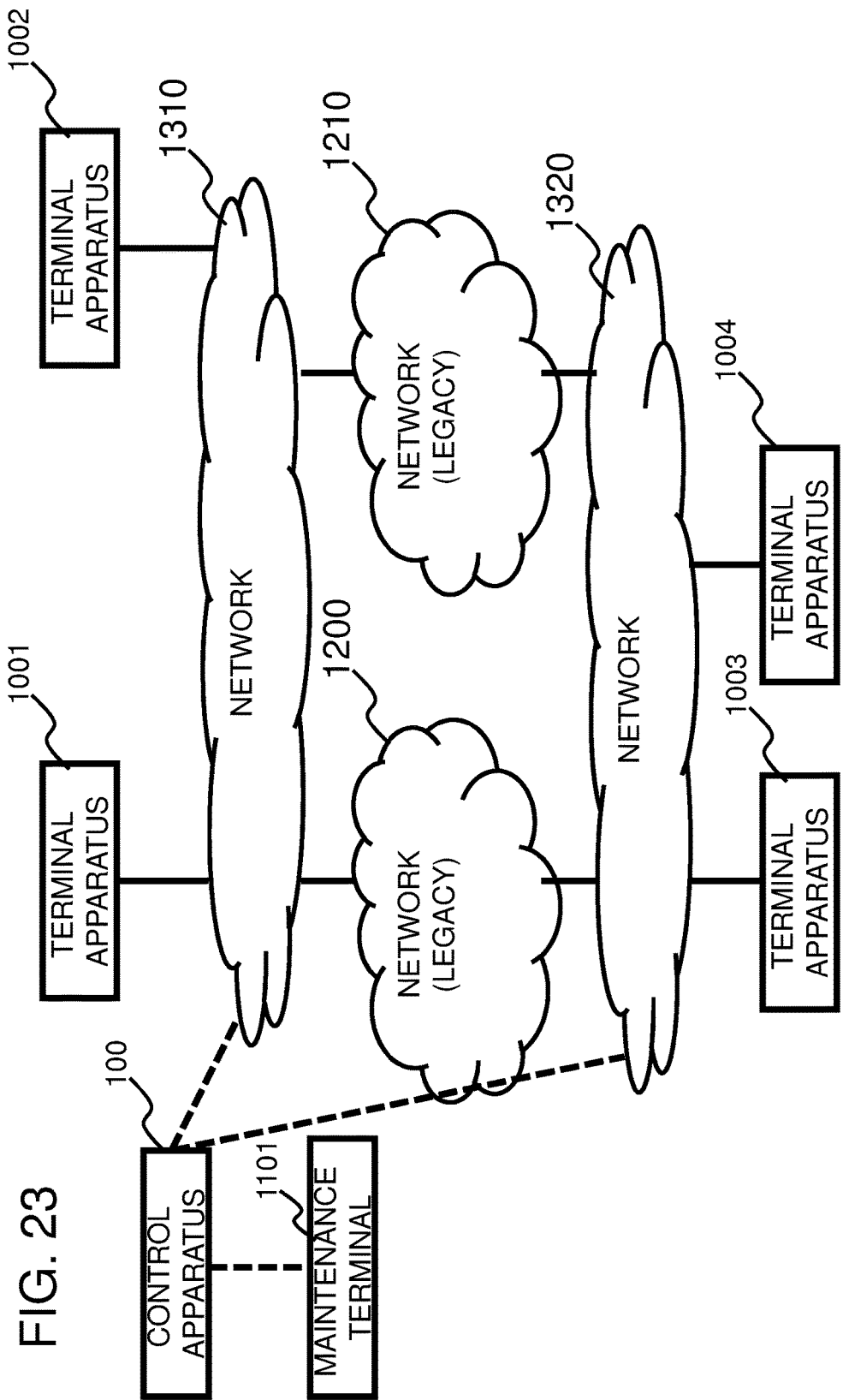
FIG. 23 illustrates a configuration of a communication system according to a third exemplary embodiment of the present disclosure.

FIG. 23 illustrates a configuration of a communication system according to a third exemplary embodiment of the present disclosure. The third exemplary embodiment differs from the second exemplary embodiment illustrated in FIG. 20 in that there are a plurality of legacy networks 1200 and 1210. This configuration can be seen as a configuration obtained by connecting two configurations according to the first exemplary embodiment in parallel with each other. This configuration is advantageous in that the control apparatus 100 can select one of the legacy networks 1200 and 1210 for forwarding user packets. For example, packets transmitted between terminal apparatuses 1001 and 1003 can be forwarded via the legacy network 1200 and packets transmitted between terminal apparatuses 1002 and 1004 can be forwarded via the legacy network 1210. Namely, the packets can be distributed. In addition, for example, the packets transmitted between the terminal apparatuses 1001 and 1003 and the packet transmitted between the terminal apparatuses 1002 and 1004 can be forwarded via the legacy network 1200, In this way, the legacy network 1210 can be suspended.

Fourth Exemplary Embodiment

Figure 24:
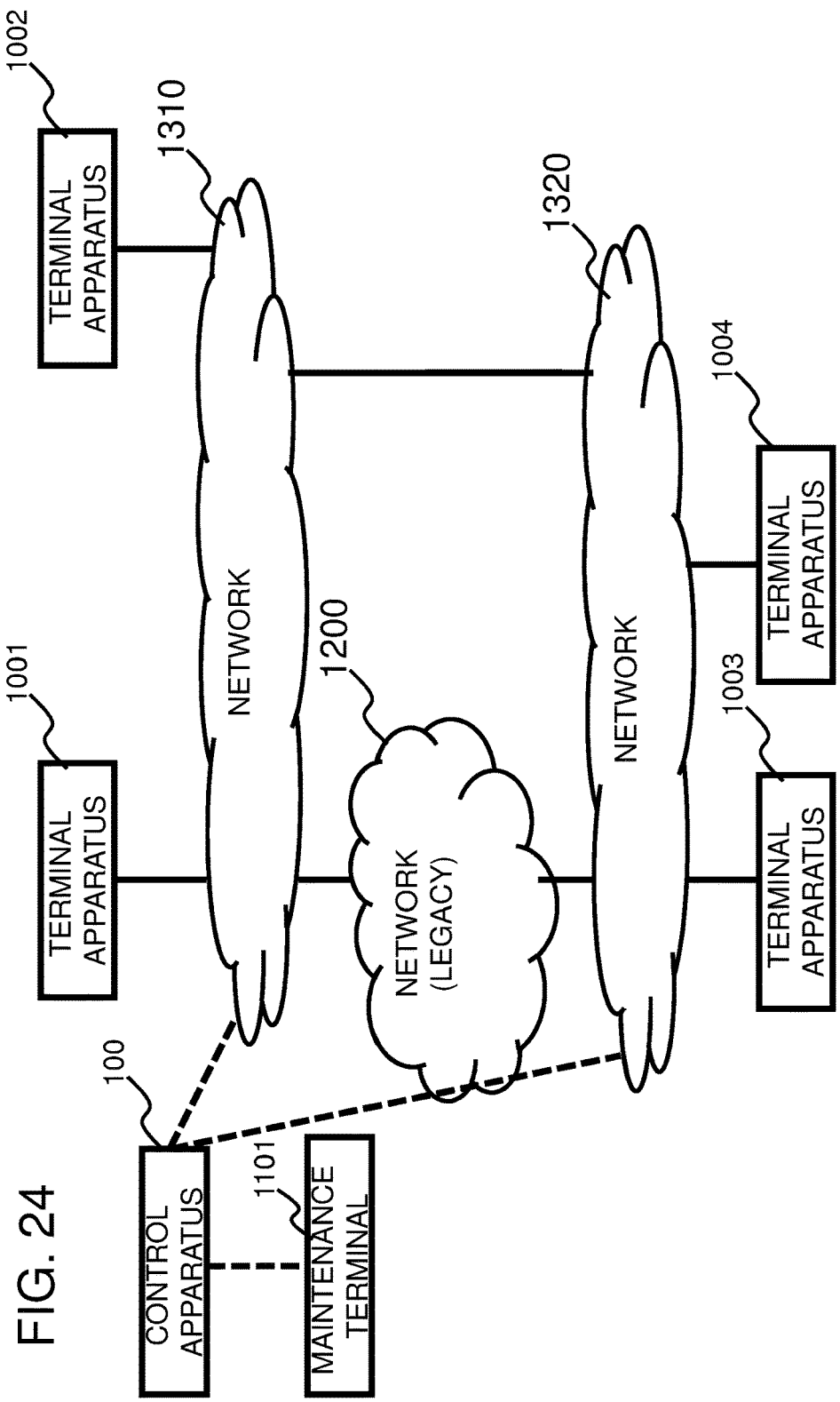
FIG. 24 illustrates a configuration of a communication system according to a fourth exemplary embodiment of the present disclosure.

FIG. 24 illustrates a configuration of a communication system according to a fourth exemplary embodiment of the present disclosure. The fourth exemplary embodiment differs from the third exemplary embodiment illustrated in FIG. 23 in that the legacy network 1210 is not arranged and that the network 1310 and the network 1320 are directly connected to each other. This configuration is advantageous in that the control apparatus 100 can select whether to forward user packets by using the legacy network 1200.

Fifth Exemplary Embodiment

Figure 25:
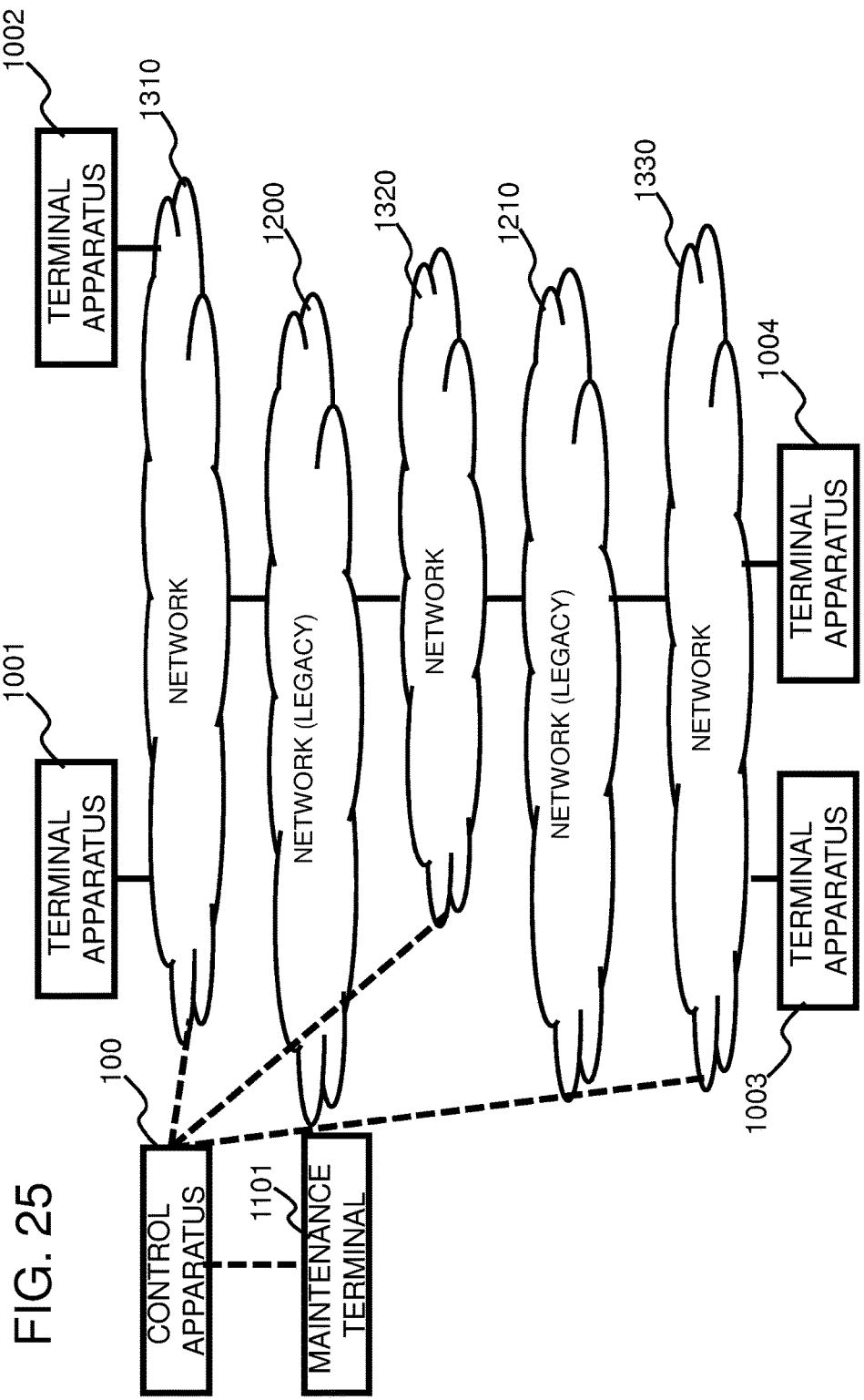
FIG. 25 illustrates a configuration of a communication system according to a fifth exemplary embodiment of the present disclosure.

FIG. 25 illustrates a configuration of a communication system according to a fifth exemplary embodiment of the present disclosure. The fifth exemplary embodiment differs from the third exemplary embodiment illustrated in FIG. 23 in that the legacy network 1210 is arranged outside the network 1310 and the network 1330 including relay apparatuses controlled by the control apparatus is arranged outside the legacy network 1210.

According to the present exemplary embodiment, through transmission of legacy link establishment packets, the relay apparatuses in the legacy networks 1200 and 1210 perform address learning. In addition, the control apparatus 100 grasps the link statuses among the relay apparatuses belonging to the networks 1310 and 1320 and the link statuses among the relay apparatuses belonging to the networks 1320 and 1330. Thus, as in the first exemplary embodiment, by setting control information instructing necessary header rewriting and packet forwarding, the control apparatus 100 can achieve packet forwarding via the two legacy networks 1200 and 1210.

Sixth Exemplary Embodiment

Figure 26:
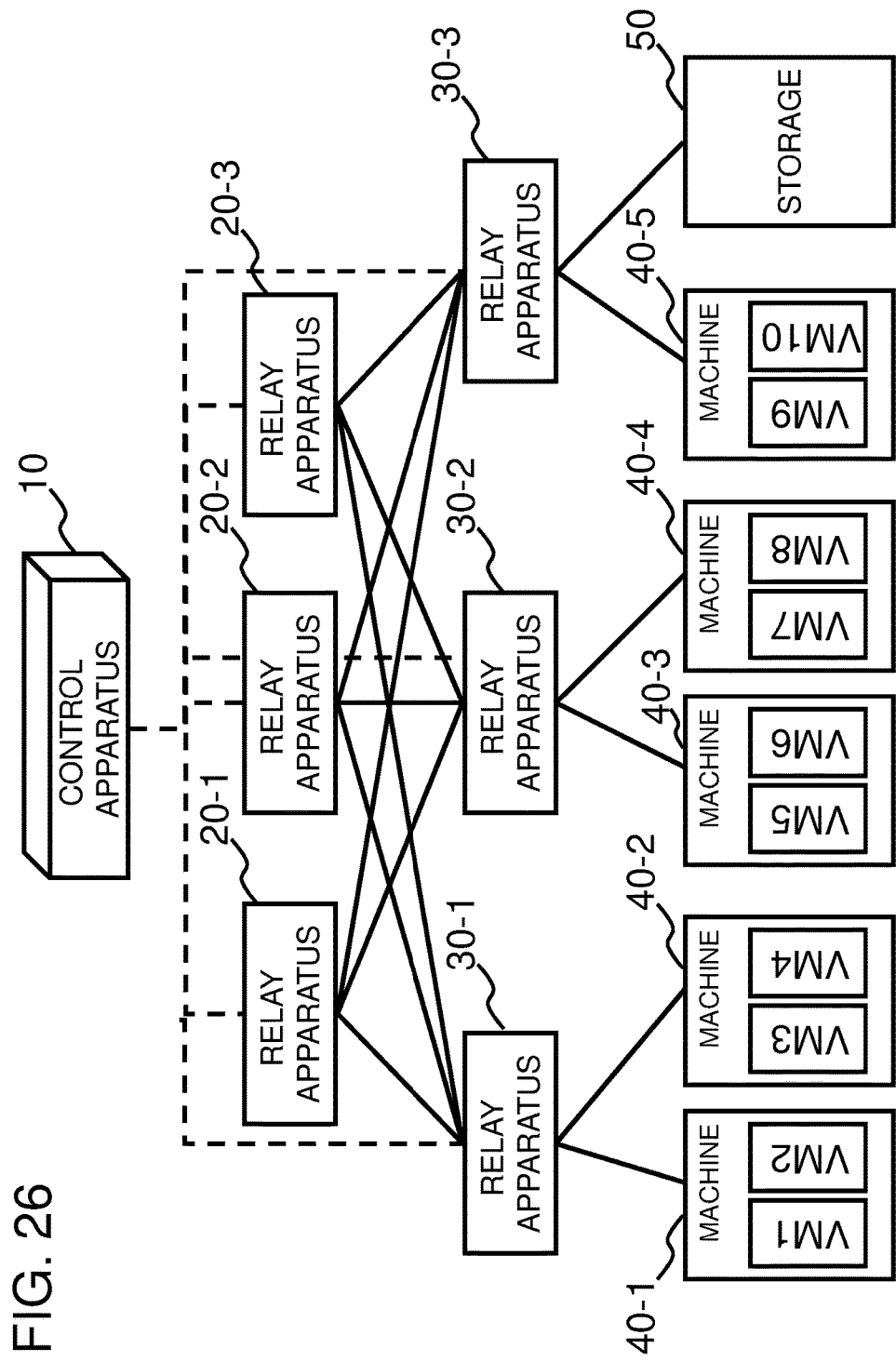
FIG. 26 illustrates a configuration of a communication system according to a sixth exemplary embodiment of the present disclosure.

Next, a sixth exemplary embodiment will be described. The six exemplary embodiment is an example in which the present disclosure is applied to communication between machines in which virtual machines operate. FIG. 26 illustrates a configuration of a communication system according to the sixth exemplary embodiment of the present disclosure. As illustrated in FIG. 6, the communication system includes (core) relay apparatuses 20-1 to 20-3 (each of which will be referred to as "a relay apparatus 20" unless otherwise distinguished) constituting a core network, (edge) relay apparatuses 30-1 to 30-3 (each of which will be referred to as "a relay apparatus 30" unless otherwise distinguished) connected to machines 40-1 to 40-5 and a storage 50, and a control apparatus 10 that controls these relay apparatuses 20-1 to 20-3 and the relay apparatuses 30-1 to 30-3.

By setting control information in the relay apparatuses 20 and 30, the control apparatus 10 controls communication among the virtual machines (VM), which operate on the machines 40-1 to 40-5, and the storage 50.

Each of the relay apparatuses 20 is connected to each of the relay apparatuses 30 so that a path can be configured between a VM and any other VM or the storage 50.

The relay apparatuses 20 and 30 store control information set by the control apparatus 10 and process received packets by referring to the control information. More specifically, when a relay apparatus 20/30 receives a packet, the relay apparatus 20/30 searches its own control information for control information having a match condition(s) that matches header information or the like of the received packet and performs the processing content(s) (action(s)) written in the control information. If the relay apparatus 20/30 does not store such control information having a match condition(s) that matches header information of the received packet, the relay apparatus 20/30 transmits the received packet (or information extracted from the received packet) to the control apparatus 10, to request setting of control information. The basic operations of the relay apparatuses 20 and 30 are the same as those of the relay apparatuses 1103 and 1104 according to the first exemplary embodiment.

The machines 40-1 to 40-5 are configured by machines referred to as virtual servers or the like in which VM1 to VM10 exclusively used by a plurality of users, respectively, operate. The storage 50 stores data accessed by these VMs. Thus, by using a VM, a user can access necessary data in the storage 50, communicate with another VM, or store data of the VM in the storage 50.

Next, an operation performed by the control apparatus 10 will be described. In this operation, control information necessary for L2-level communication such as between a VM and the storage or between two VMs is set.

Figure 27:
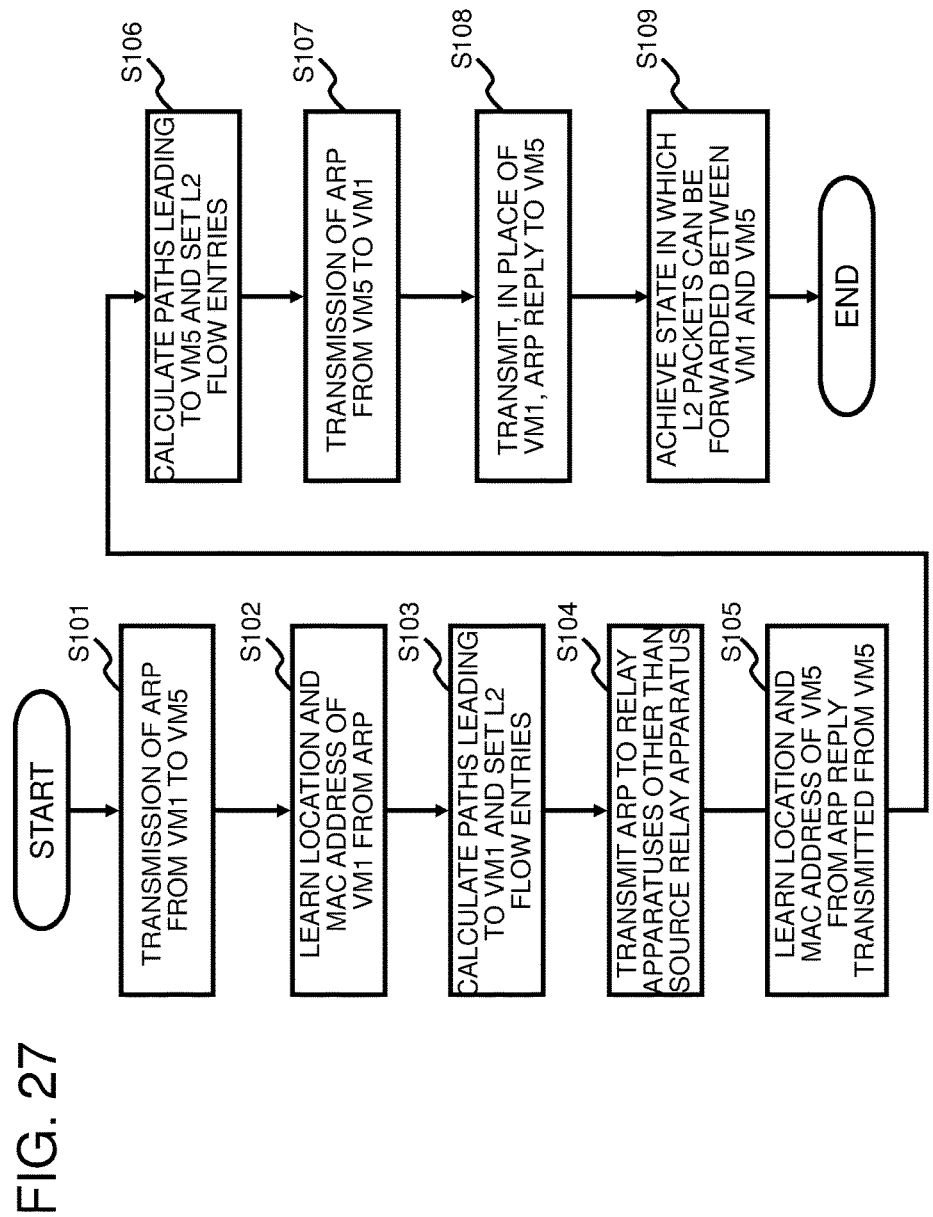
FIG. 27 is a flowchart illustrating an operation performed by a control apparatus according to the sixth exemplary embodiment of the present disclosure.

FIG. 27 is a flowchart illustrating an operation performed by the control apparatus 10 according to the sixth exemplary embodiment of the present disclosure. This operation assumes that the control apparatus 10 performs setting for allowing the VM1 to communicate with the VM5. First, to resolve the MAC address of the VM5, the VM1 transmits an ARP (Address Resolution Protocol) packet (step S101).

Since the relay apparatus 30-1 does not store control information corresponding to the ARP packet, the relay apparatus 30-1 forwards the ARP packet to the control apparatus 10. From the received ARP packet, the control apparatus 10 learns the location of the VM1 (connected to a certain port of the relay apparatus 30-1) and the MAC address of the VM1 (step S102).

Next, the control apparatus 10 calculates forwarding paths that lead to the VM1 from the other relay apparatuses 30-2 and 30-3 via relay apparatus 30-1. In addition, the control apparatus 10 generates L2 control information (first control information) that realizes packet forwarding on the calculated forwarding paths and sets the generated control information in the relay apparatuses on the paths (step S103).

Figure 28:
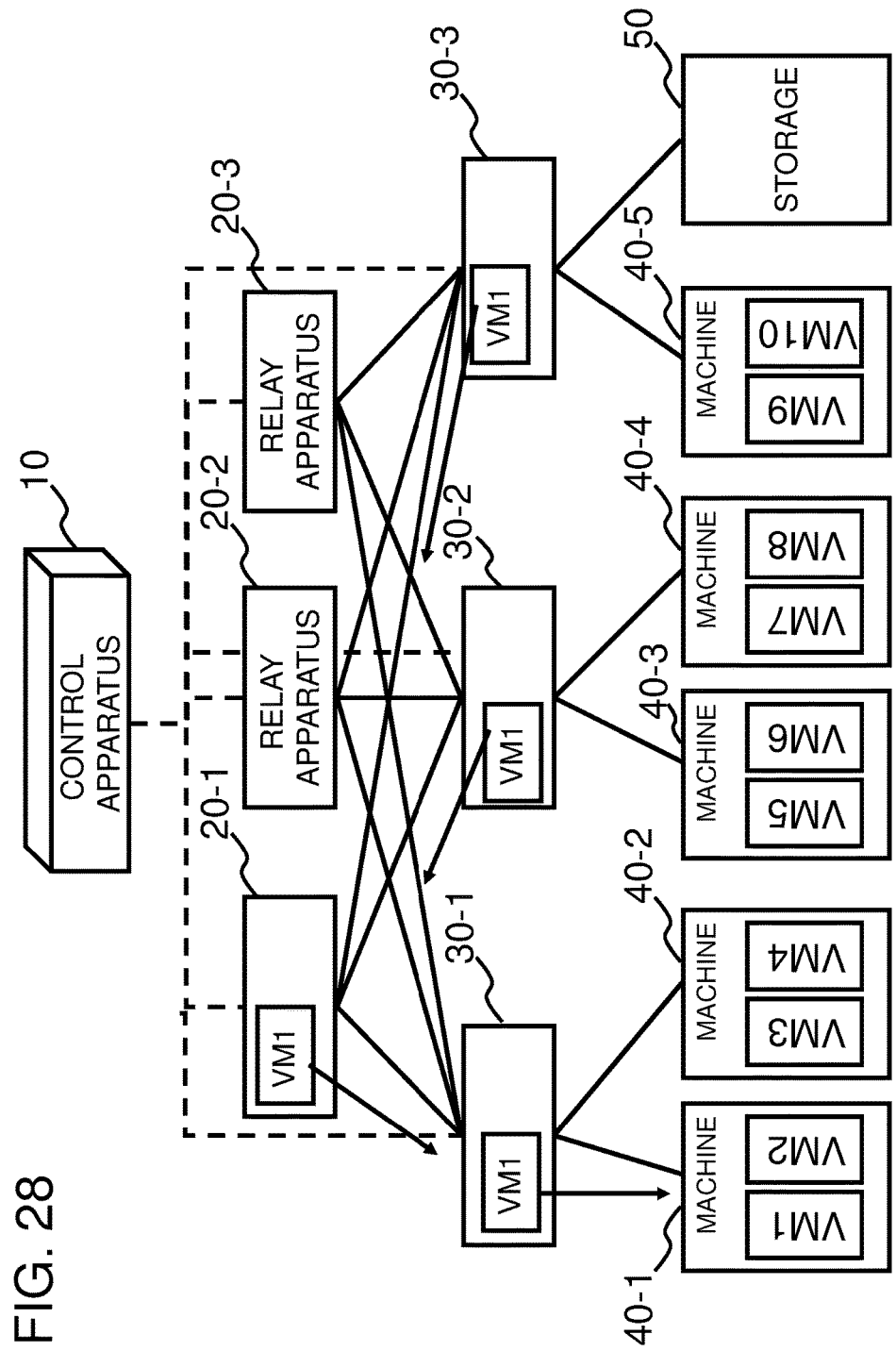
FIG. 28 illustrates a control information setting operation performed by the control apparatus according to the sixth exemplary embodiment of the present disclosure.

FIG. 28 illustrates a state obtained after setting of the L2 control information which realizes forwarding paths that lead to the VM1 is completed. The reference characters "VM1" in the boxes indicating the relay apparatuses 20-1 and 30-1 to 30-3 in FIG. 28 represent the control information which realizes forwarding paths that lead to the VM1.

Next, the control apparatus 10 transmits the ARP packet received in step S102 to the relay apparatuses other than the source relay apparatus 30-1, namely, to the relay apparatuses 30-2 and 30-3 (step S104). The relay apparatuses 30-2 and 30-3 forward the received ARP packet to the VM5 to VM10 that operate in the relay apparatuses 30-2 and 30-3.

Since this ARP packet is for resolving the MAC address of the VM5, the VM5 transmits an ARP reply packet. Since the relay apparatus 30-2 does not store control information corresponding to the ARP reply packet, the relay apparatus 30-2 forwards the ARP reply packet to the control apparatus 10. From the received ARP reply packet, the control apparatus 10 learns the location of the VM5 (connected to a certain port of the relay apparatus 30-2) and the MAC address of the VM5 (step S105). In addition, in place of the VM5, the control apparatus 10 transmits the learned MAC address of the VM5 to the VM1.

Next, the control apparatus 10 calculates forwarding paths that lead to the VM5 from the other relay apparatuses 30-1 and 30-3 via the relay apparatus 30-2. In addition, the control apparatus 10 generates L2 control information (first control information) that realizes packet forwarding on the calculated forwarding paths and sets the generated control information in the relay apparatuses on the paths (step S106).

Figure 29:
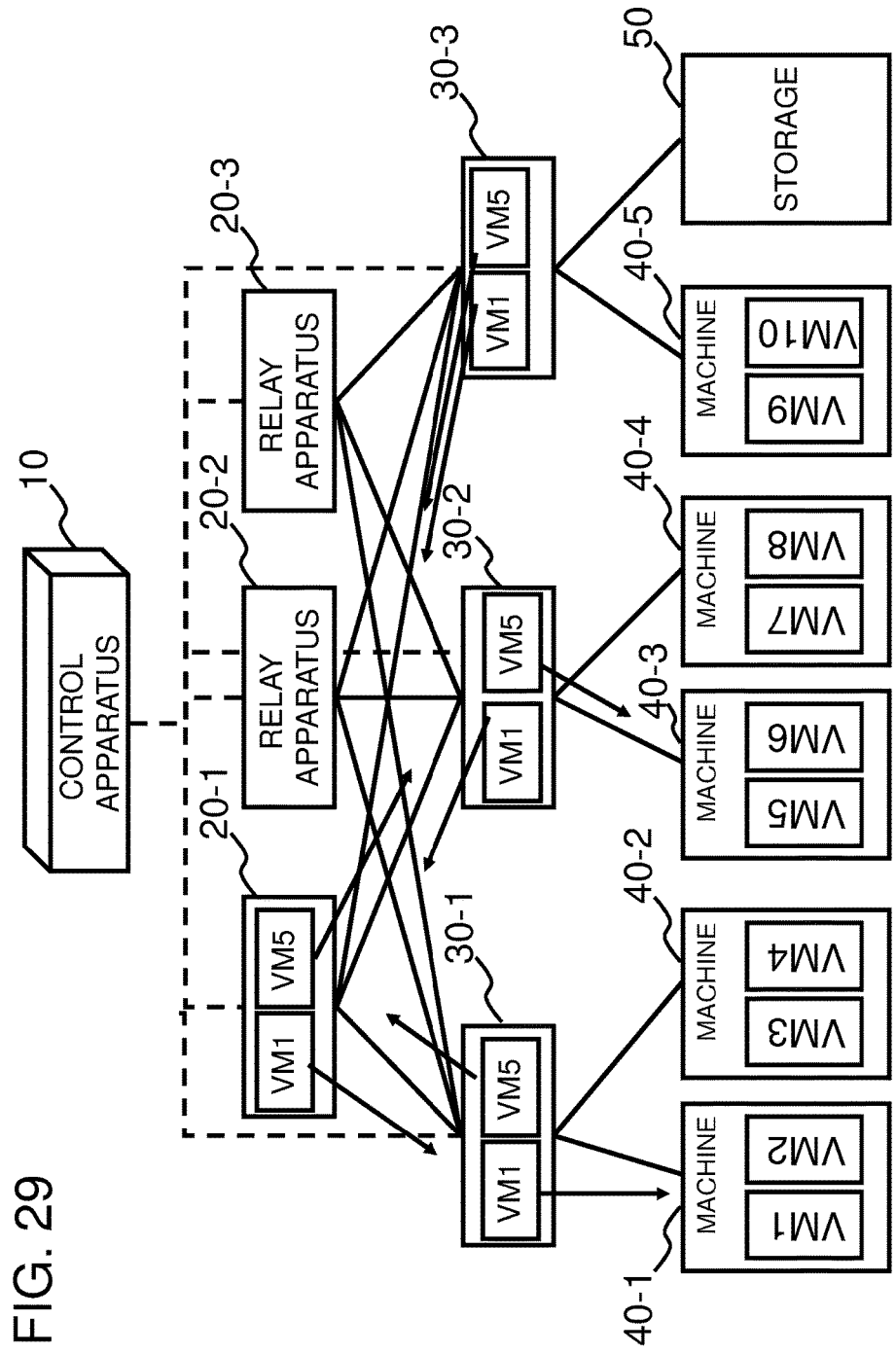
FIG. 29 illustrates a control information setting operation performed by the control apparatus according to the sixth exemplary embodiment of the present disclosure.

FIG. 29 illustrates a state obtained after setting of the L2 control information which realizes forwarding paths that lead to the VM1 and the VM5 is completed. The reference characters "VM5" in the boxes indicating the relay apparatuses 20-1 and 30-1 to 30-3 in FIG. 29 represent the control information which realizes forwarding paths that lead to the VM5.

Next, the VM5 transmits an ARP packet for resolving the MAC address of the VM1 to the VM1 (step S107). Since the relay apparatus 30-2 does not store control information corresponding to the ARP packet, the relay apparatus 30-2 forwards the ARP packet to the control apparatus 10. In place of the VM1, the control apparatus 10 transmits the MAC address of the VM1 learned in step S102 to the VM5 (step S108).

In this way, the VM1 and the VM5 are enabled to exchange L2 packets by using each other's MAC address as their destination (step S109).

FIGS. 30 and 31 illustrate exemplary control information set in the relay apparatuses 30-1, 20-1, and 30-2 before step S109. FIG. 30 illustrates control information for processing L2 packets addressed to the VM5 from the VM1. In the control information, a match condition indicating that the destination MAC address is the MAC address of the VM5 and a processing content (action) for performing packet forwarding on a forwarding path are associated with each other. Likewise, FIG. 31 illustrates control information for processing L2 packets addressed to the VM5 from the VM1. In each of the match conditions, a destination MAC address alone is specified. Thus, forwarding can be realized without increasing the load on the relay apparatuses and the control apparatus 10.

Next, a case in which an L3 packet is transmitted between the VM1 and the VM5 will be described. FIG. 32 illustrates source and destination addresses of L2 and L3 packets exchanged between the VM1 and the VM5. As illustrated in FIG. 32, regarding an L3 packet, since the MAC address of an apparatus set as a default gateway (the control apparatus 10 in the present exemplary embodiment) is set as the destination MAC address, the L3 packet cannot be forwarded by the control information illustrated in FIGS. 30 and 31. Thus, the relay apparatus 30-1 forwards the L3 packet to the control apparatus 10 to request setting of control information.

Figure 33:
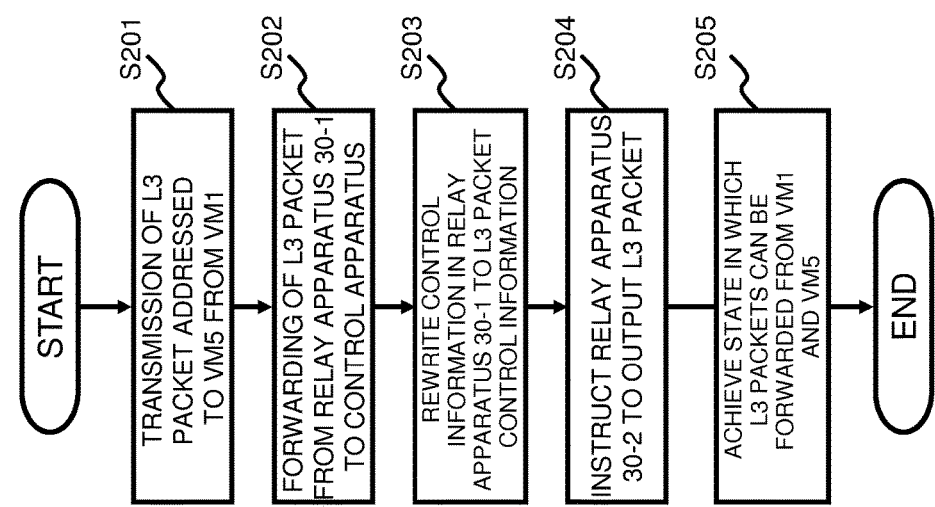
FIG. 33 is a flowchart illustrating an operation performed by the control apparatus according to the sixth exemplary embodiment of the present disclosure.

FIG. 33 is a flowchart illustrating an operation performed by the control apparatus 10 when the VM1 transmits an L3 packet addressed to the VM5.

As illustrated in FIG. 33, when the VM1 transmits an L3 packet addressed to the VM5 (step S201), the relay apparatus 30-1 forwards the L3 packet to the control apparatus 10 to request setting of control information (step S202).

When receiving the control information setting request, the control apparatus 10 rewrites the control information already set in the relay apparatus 30-1 as illustrated in FIG. 30 to the control information as illustrated in FIG. 34 (step S203). In FIG. 34, if the MAC address of the GW (the control apparatus 10) is set as the destination MAC address and the IP address of the VM5 is set as the destination IP address, namely, if the relay apparatus 30-1 receives an L3 packet whose destination is the VM5, the relay apparatus 30-1 rewrites the source MAC address to the MAC address of the GW (the control apparatus 10), rewrites the destination MAC address to the MAC address of the VM5, and forwards the packet to the relay apparatus 20-1. As a result, the relay apparatuses 20-1 and 30-2 can forward the L3 packet addressed to the VM5 as an L2 packet.

In addition, the control apparatus 10 rewrites the control information already set in the relay apparatus 30-2 as illustrated in FIG. 31 to the control information as illustrated in FIG. 35. In FIG. 35, if the MAC address of the GW (the control apparatus 10) is set as the destination MAC address and the IP address of the VM1 is set as the destination IP address, namely, if the relay apparatus 30-2 receives an L3 packet whose destination is the VM1, the relay apparatus 30-2 rewrites the source MAC address to the MAC address of the GW (the control apparatus 10), rewrites the destination MAC address to the MAC address of the VM1, and forwards the packet to the relay apparatus 20-1. As a result, the relay apparatuses 20-1 and 30-1 can forward the L3 packet addressed to the VM1 as an L2 packet.

After rewriting the control information, the control apparatus 10 forwards the L3 packet, forwarded in step S202 and addressed to the VM5, to the exist-side relay apparatus 30-2 and causes this exist-side relay apparatus 30-2 to forward the L3 packet to the VM5 (step S204).

Since the control information (second control information) illustrated in FIGS. 34 and 35 is set, subsequent L3 packets can be exchanged between the VM1 and the VM5 (step S205). When the subsequent L3 packets are exchanged, since the entry-side relay apparatus performs necessary rewriting, the subsequent relay apparatuses can forward the packets in accordance with the control information having the match condition indicating the destination MAC address, without being set with new control information.

Thus, the present disclosure is also suitably applicable to a virtual environment in which VMs and storages operate.

Finally, suitable modes of the present invention will be summarized.

[Mode 1]
(See the control apparatus according to the above first aspect)

[Mode 2]
The control apparatus according to mode 1;
wherein the first hierarchical address is a MAC (Media Access Control) address and the second hierarchical address is an IP (Internet Protocol) address.

[Mode 3]
The control apparatus according to mode 2;
wherein, when receiving an ARP (Address Resolution Protocol) packet from one machine via one of the relay apparatuses, the first control information setting unit forwards the ARP packet to the other machines via the relay apparatus; and
wherein, when receiving an ARP reply packet in response to the ARP packet via one of the subordinate relay apparatuses, the first control information setting unit calculates a path between the machines that have transmitted the ARP packet and the ARP reply packet, respectively, and sets first control information for causing relay apparatuses on the path to forward packets on the path.

[Mode 4]
The control apparatus according to any one of modes 1 to 3;
wherein the second control information is generated by adding processing for conversion of a destination MAC address in a processing content field in the first control information.

[Mode 5]
(See the communication system according to the above second aspect)

[Mode 6]
(See the communication method according to the above third aspect)

[Mode 7]
(See the program according to the above fourth aspect)

[Mode 8]
A control apparatus, including:
a specific links management unit configured to grasp, among relay apparatuses that are controlled by the control apparatus, a link status between each pair of relay apparatuses connected to each other via a network that is not controlled by the control apparatus;
a topology management unit configured to establish topology information on the basis of information acquired from the relay apparatuses that are controlled by the control apparatus and update the topology information on the basis of a link status between each pair of relay apparatuses connected to each other via the network that is not controlled by the control apparatus;
a path management unit configured to calculate a packet forwarding path between machines that are connected to respective relay apparatuses of the relay apparatuses on the basis of topology information including a link between each pair of relay apparatuses that are connected to each other via the network that is not controlled by the control apparatus and generate control information for causing relay apparatuses on the forwarding path to forward packets on the forwarding path; and
a relay apparatus communication unit configured to set the control information in the relevant relay apparatuses;
wherein, among the relay apparatuses on the forwarding path that extends through the network that is not controlled by the control apparatus, the control apparatus causes a relay apparatus that is located immediately before the network that is not controlled by the control apparatus to rewrite header information so that packets are allowed to pass through the network that is not controlled by the control apparatus; and
wherein, among the relay apparatuses on the forwarding path that extends through the network that is not controlled by the control apparatus, the control apparatus causes a relay apparatus that is located immediately after the network that is not controlled by the control apparatus to restore the rewritten header information.

[Mode 9]
The control apparatus according to mode 8;
wherein the specific links management unit grasps a link status between each pair of relay apparatuses connected to each other via the network that is not controlled by the control apparatus by causing one relay apparatus connected to the network that is not controlled by the control apparatus to transmit a predetermined packet to its counterpart relay apparatus connected to the network that is not controlled by the control apparatus and determining whether the counterpart relay apparatus has received the predetermined packet.

[Mode 10]
A communication system, including:
a control apparatus, including:
a specific links management unit configured to grasp, among relay apparatuses that are controlled by the control apparatus, a link status between each pair of relay apparatuses connected to each other via a network that is not controlled by the control apparatus;
a topology management unit configured to establish topology information on the basis of information acquired from the relay apparatuses that are controlled by the control apparatus and update the topology information on the basis of a link status between each pair of relay apparatuses connected to each other via the network that is not controlled by the control apparatus;
a path management unit configured to calculate a packet forwarding path between machines that are connected to respective relay apparatuses of the relay apparatuses on the basis of topology information including a link between each pair of relay apparatuses that are connected to each other via the network that is not controlled by the control apparatus and generate control information for causing relay apparatuses on the forwarding path to forward packets on the forwarding path; and
a relay apparatus communication unit configured to set the control information in the relevant relay apparatuses;
wherein, among the relay apparatuses on the forwarding path that extends through the network that is not controlled by the control apparatus, the control apparatus causes a relay apparatus that is located immediately before the network that is not controlled by the control apparatus to rewrite header information so that packets are allowed to pass through the network that is not controlled by the control apparatus; and
wherein, among the relay apparatuses on the forwarding path that extends through the network that is not controlled by the control apparatus, the control apparatus causes a relay apparatus that is located immediately after the network that is not controlled by the control apparatus to restore the rewritten header information; and
a plurality of relay apparatuses configured to operate in accordance with control information set by the control apparatus, at least one of the relay apparatuses being arranged on one side of the network that is not controlled by the control apparatus (namely, legacy network) and at least one relay apparatus being arranged on another side of the legacy network.

[Mode 11]
A communication method, causing a control apparatus including:
a specific links management unit configured to grasp, among relay apparatuses that are controlled by the control apparatus, a link status between each pair of relay apparatuses connected to each other via a network that is not controlled by the control apparatus;
a topology management unit configured to establish topology information on the basis of information acquired from the relay apparatuses that are controlled by the control apparatus and update the topology information on the basis of a link status between each pair of relay apparatuses connected to each other via the network that is not controlled by the control apparatus;
a path management unit configured to calculate a packet forwarding path between machines that are connected to respective relay apparatuses of the relay apparatuses on the basis of topology information including a link between each pair of relay apparatuses that are connected to each other via the network that is not controlled by the control apparatus and generate control information for causing relay apparatuses on the forwarding path to forward packets on the forwarding path; and
a relay apparatus communication unit configured to set the control information in the relevant relay apparatuses, to perform steps of:
causing, among the relay apparatuses on the forwarding path that extends through the network that is not controlled by the control apparatus, a relay apparatus that is located immediately before the network that is not controlled by the control apparatus to rewrite header information so that packets are allowed to pass through the network that is not controlled by the control apparatus; and
causing, among the relay apparatuses on the forwarding path that extends through the network that is not controlled by the control apparatus, a relay apparatus that is located immediately after the network that is not controlled by the control apparatus to restore the rewritten header information.

[Mode 12]
A program, causing a computer constituting a control apparatus including:
a specific links management unit configured to grasp, among relay apparatuses that are controlled by the control apparatus, a link status between each pair of relay apparatuses connected to each other via a network that is not controlled by the control apparatus;
a topology management unit configured to establish topology information on the basis of information acquired from the relay apparatuses that are controlled by the control apparatus and update the topology information on the basis of a link status between each pair of relay apparatuses connected to each other via the network that is not controlled by the control apparatus;
a path management unit configured to calculate a packet forwarding path between machines that are connected to respective relay apparatuses of the relay apparatuses on the basis of topology information including a link between each pair of relay apparatuses that are connected to each other via the network that is not controlled by the control apparatus and generate control information for causing relay apparatuses on the forwarding path to forward packets on the forwarding path; and
a relay apparatus communication unit configured to set the control information in the relevant relay apparatuses, to perform processing for:
causing, among the relay apparatuses on the forwarding path that extends through the network that is not controlled by the control apparatus, a relay apparatus that is located immediately before the network that is not controlled by the control apparatus to rewrite header information so that packets are allowed to pass through the network that is not controlled by the control apparatus; and
causing, among the relay apparatuses on the forwarding path that extends through the network that is not controlled by the control apparatus, a relay apparatus that is located immediately after the network that is not controlled by the control apparatus to restore the rewritten header information.

The above modes 5 to 7 can be expanded in the same way as mode 1 is expanded to modes 2 to 4. Likewise, the above modes 10 to 12 can be expanded in the same way as mode 8 is expanded to mode 9.

The disclosure of each of the above PTL and NPLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 10, 10A, 100 control apparatus
11 first control information setting unit
12 second control information setting unit
20-1 to 20-3 and 30-1 to 30-3 relay apparatus
40-1 to 40-5 machine
50 storage
101 relay apparatus communication unit
102 topology management unit
103 topology table
104 maintenance terminal communication unit
105 legacy management unit
106 legacy management table
107 legacy link management unit
108 legacy link management table
109 path management unit
1101 maintenance terminal
1001 to 1004, 1102, 1105 terminal apparatus
1010, 1011, 1018, 1019, 1103, 1104 relay apparatus
1071 to 1076, 1106, 1107 relay apparatus (L2)
1200, 1210 legacy network
1300 to 1330 network
P1 to P4 port number

What is claimed is:

1. A control apparatus, comprising:
a first hardware control information setting unit configured to set, in relay apparatuses, first control information for forwarding packets on a predetermined path between predetermined machines; and a second hardware control information setting unit configured to: receive, via a first relay apparatus of the relay apparatuses and from a first machine of the predetermined machines in which the first control information has been set, a packet having a MAC (Media Access Control) address and destination IP (Internet Protocol) address; and in response to receiving the packet, set, in the first relay apparatus, second control information for converting the MAC address of the packet into an IP address, the IP address being specified in the first control information set in the first relay apparatus, wherein the first relay apparatus converts the packet based on the second control information and forwards the converted packet; wherein, when receiving an ARP (Address Resolution Protocol) packet from one of the predetermined machines via one of the relay apparatuses, the first hardware control information setting unit is configured to forward the ARP packet to the other of the predetermined machines via the one relay apparatus; and wherein, when receiving an ARP reply packet in response to the ARP packet via one of the subordinate relay apparatuses, the first hardware control information setting unit is configured to calculate a path between respective machines of the predetermined machines that have transmitted the ARP packet and the ARP reply packet, and, to set in relay apparatus on the calculated path, first control information for causing the relay apparatuses on the calculated path to forward packets on the calculated path.

2. The control apparatus according to claim 1;
wherein the second control information is generated by adding processing for conversion of a destination MAC address in a processing content field in the first control information.

3. A communication system, comprising: a control apparatus comprising: a first hardware control information setting unit configured to set, in relay apparatuses, first control information for forwarding packets on a predetermined path between predetermined machines; and
a second hardware control information setting unit configured to: receive, via a first relay apparatus of the relay apparatuses and from a first machine of the predetermined machines in which the first control information has been set, a packet having a MAC (Media Access Control) address and destination IP (Internet Protocol) address; and in response to receiving the packet, set, in the first relay apparatus, second control information for converting the MAC address of the packet into an IP address, the IP address being specified in the first control information set in the first relay apparatus, wherein the first relay apparatus converts the packet based on the second control information and forwards the converted packet; wherein, when receiving an ARP (Address Resolution Protocol) packet from one of the predetermined machines via one of the relay apparatuses, the first hardware control information setting unit is configured to forward the ARP packet to the other of the predetermined machines via the one relay apparatus; and wherein, when receiving an ARP reply packet in response to the ARP packet via one of the subordinate relay apparatuses, the first hardware control information setting unit is configured to calculate a path between the respective machines of the predetermined machines that have transmitted the ARP packet and the ARP reply packet and to set, in relay apparatus on the calculated path, first control information for causing the relay apparatuses on the calculated path to forward packets on the calculated path.

4. The communication system according to claim 3;
wherein the second control information is generated by adding processing for conversion of a destination MAC address in a processing content field in the first control information.

5. A communication method, comprising:
setting, in relay apparatuses, first control information for forwarding packets on a predetermined path between predetermined machines; and
receiving, via a first relay apparatus of the relay apparatuses and from a first machine of the predetermined machines in which the first control information has been set, a packet having a MAC (Media Access Control) address and destination IP (Internet Protocol) address; and in response to receiving the packet in the first relay apparatus, set, in the first relay apparatus, second control information for converting the MAC address of the packet into an IP address, the IP address being specified in the first control information set in the first relay apparatus, wherein the first relay apparatus converts the packet based on the second control information and forwards the converted packet;

wherein, when receiving an ARP (Address Resolution Protocol) packet from one of the predetermined machines via one of the relay apparatuses, the first control information setting unit is configured to forward the ARP packet to the other of the predetermined machines via the one relay apparatus; and wherein, when receiving an ARP reply packet in response to the ARP packet via one of the subordinate relay apparatuses, the first control information setting unit is configured to calculate a path between the respective machines of the predetermined machines that have transmitted the ARP packet and the ARP reply packet and to set, in relay apparatus on the calculated path, first control information for causing the relay apparatuses on the calculated path to forward packets on the calculated path.

6. The communication method according to claim 5;

wherein the second control information is generated by adding processing for conversion of a destination MAC address in a processing content field in the first control information.

7. A control apparatus, comprising:

memory storing instructions; and one or more processors configured to execute the instructions to:

set, in relay apparatuses, first control information for forwarding packets on a predetermined path between predetermined machines; and receive, via a first relay apparatus of the relay apparatuses and from a first machine of the predetermined machines in which the first control information has been set, a packet having a MAC (Media Access Control) address and destination IP (Internet Protocol) address; and in response to receiving the packet, set, in the first relay apparatus, second control information for converting the MAC address of the packet into an IP address, the IP address being specified in the first control information set in the first relay apparatus, wherein the first relay apparatus converts the packet based on the second control information and forwards the converted packet;

wherein, when receiving an ARP (Address Resolution Protocol) packet from one of the predetermined machines via one of the relay apparatuses, the one or more processors are further configured to execute the instructions to forward the ARP packet to the other of the predetermined machines via the one relay apparatus; and wherein, when receiving an ARP reply packet in response to the ARP packet via one of the subordinate relay apparatuses, a first control information setting unit is configured to calculate a path between respective machines of the predetermined machines that have transmitted the ARP packet and the ARP reply packet and to set, in relay apparatus on the calculated path, first control information for causing the relay apparatuses on the calculated path to forward packets on the calculated path.

8. The control apparatus according to claim 7;

wherein the second control information is generated by adding processing for conversion of a destination MAC address in a processing content field in the first control information.

9. A communication system, comprising:

a control apparatus comprising:

memory storing instructions; and one or more processors configured to execute the instructions to:

set, in relay apparatuses, first control information for forwarding packets on a predetermined path between predetermined machines; and receive, via a first relay apparatus of the relay apparatuses and from a first machine of the predetermined machines in which the first control information has been set, a packet having a MAC (Media Access Control) address and destination IP (Internet Protocol) address; and in response to receiving the packet, set, in the first relay apparatus, second control information for converting the MAC address of the packet into an IP address, the IP address being specified in the first control information set in the first relay apparatus, wherein the first relay apparatus converts the packet based on the second control information and forwards the converted packet;

wherein, when receiving an ARP (Address Resolution Protocol) packet from one of the predetermined machines via one of the relay apparatuses, the one or more processors are further configured to execute the instructions to forward the ARP packet to the other of the predetermined machines via the one relay apparatus; and wherein, when receiving an ARP reply packet in response to the ARP packet via one of the subordinate relay apparatuses, a first control information setting unit is configured to calculate a path between the respective machines of the predetermined machines that have transmitted the ARP packet and the ARP reply packet and to set, in relay apparatus on the calculated path, first control information for causing the relay apparatuses on the calculated path to forward packets on the calculated path.

10. The communication system according to claim 9;

wherein the second control information is generated by adding processing for conversion of a destination MAC address in a processing content field in the first control information.

11. A communication method, comprising:

memory storing instructions; and one or more processors configured to execute the instructions to:

set, in relay apparatuses, first control information for forwarding packets on a predetermined path between predetermined machines; and receive, via a first relay apparatus of the relay apparatuses and from a first machine of the predetermined machines in which the first control information has been set, a packet having a MAC (Media Access Control) address and destination IP (Internet Protocol) address; and in response to receiving the packet in the first relay apparatus, set, in the first relay apparatus, second control information for converting the MAC address of the packet into an IP address, the IP address being specified in the first control information set in the first relay apparatus, wherein the first relay apparatus converts the packet based on the second control information and forwards the converted packet;

wherein, when receiving an ARP (Address Resolution Protocol) packet from one of the predetermined machines via one of the relay apparatuses, the one or more processors are further configured to execute the instructions to forward the ARP packet to the other of the predetermined machines via the one relay apparatus; and wherein, when receiving an ARP reply packet in response to the ARP packet via one of the subordinate relay apparatuses, a first control information setting unit is configured to calculate a path between the respective machines of the predetermined machines that have transmitted the ARP packet and the ARP reply packet and to set, in relay apparatus on the calculated path, first control information for causing the relay apparatuses on the calculated path to forward packets on the calculated path.

12. The communication method according to claim 11; wherein the second control information is generated by adding processing for conversion of a destination MAC address in a processing content field in the first control information.

\* \* \* \* \*